US012645409B2

(12) United States Patent
Hasegawa et al.

(10) Patent No.: US 12,645,409 B2
(45) Date of Patent: Jun. 2, 2026

(54) INK JET SYSTEM FOR CORRECTING EJECTION FAILURES

(71) Applicant: SEIKO EPSON CORPORATION, Tokyo (JP)

(72) Inventors: Tomonaga Hasegawa, Matsumoto (JP); Toshiro Murayama, Fujimi-machi (JP); Akira Miyagishi, Shiojiri (JP); Nobuaki Ito, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/507,162

(22) Filed: Nov. 13, 2023

(65) Prior Publication Data

US 2024/0160391 A1 May 16, 2024

(30) Foreign Application Priority Data

Nov. 15, 2022 (JP) ................................. 2022-182699

(51) Int. Cl.
*G06F 3/12* (2006.01)
*B41J 2/045* (2006.01)
*B41J 2/165* (2006.01)

(52) U.S. Cl.
CPC ............ *G06F 3/121* (2013.01); *B41J 2/0451* (2013.01); *B41J 2/16579* (2013.01); *G06F 3/1234* (2013.01); *G06F 3/129* (2013.01)

(58) Field of Classification Search
CPC ........ G06F 3/121; G06F 3/1234; G06F 3/129; B41J 2/0451; B41J 2/16579
See application file for complete search history.

(56) References Cited

U.S. PATENT DOCUMENTS

| 2021/0237429 | A1* | 8/2021 | Toda | .................... | B41J 2/16517 |
| 2021/0243331 | A1* | 8/2021 | Motoki | .............. | H04N 1/32374 |
| 2021/0300023 | A1* | 9/2021 | Kubo | ..................... | B41J 2/0451 |
| 2021/0303245 | A1* | 9/2021 | Toda | ..................... | G06F 3/1285 |
| 2023/0117636 | A1* | 4/2023 | Hanamura | ........... | B41J 2/14233 |
| | | | | | 347/5 |
| 2023/0311513 | A1* | 10/2023 | Kanamura | ........... | B41J 2/16526 |
| | | | | | 347/22 |

FOREIGN PATENT DOCUMENTS

JP          2015-157426 A          9/2015

* cited by examiner

*Primary Examiner* — Nicholas Pachol
(74) *Attorney, Agent, or Firm* — WORKMAN NYDEGGER

(57) ABSTRACT

An ink jet system includes: a recording apparatus that is equipped with a head unit that ejects ink and executes recording processing for recording on a recording medium; a processing apparatus that is coupled to the recording apparatus and executes data processing for causing the recording apparatus to execute the recording processing; and a server configured to be connected to any one of the recording apparatus and the processing apparatus. When an ejection failure of the head unit is a first ejection failure that is resolved by executing predetermined recovery processing, either the recording apparatus or the processing apparatus executes first correction processing, and when the ejection failure of the head unit is a second ejection failure that is not resolved by executing the predetermined recovery processing, the server executes second correction processing.

9 Claims, 23 Drawing Sheets

FIG. 8
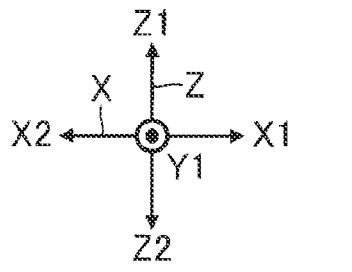
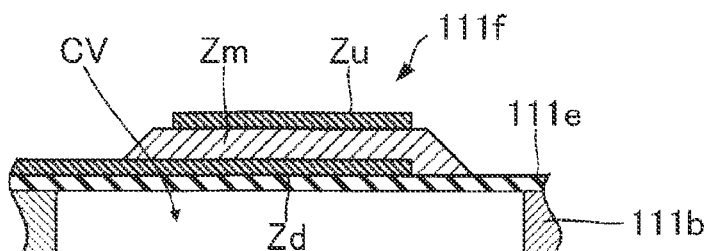

FIG. 11

| Sd[n1m1] | DESIGNATION CONTENTS OF Sd[n1m1] | SLa[n1m1] | | SLb[n1m1] | | | SLs[n1m1] | | |
|---|---|---|---|---|---|---|---|---|---|
| | | Tu1 | Tu2 | TSS1 | TSS2 | TSS3 | TSS1 | TSS2 | TSS3 |
| (1, 1, 0) | LARGE DOT | H | H | L | L | L | L | L | L |
| (1, 0, 0) | MEDIUM DOT | H | L | L | L | L | L | L | L |
| (0, 1, 0) | SMALL DOT | L | H | L | L | L | L | L | L |
| (0, 0, 0) | NON-EJECTION | L | L | L | L | L | L | L | L |
| (1, 1, 1) | DETERMINATION TARGET | L | L | H | L | H | L | H | L |

FIG. 13

TNI

| EJECTION FAILURE NOZZLE INFORMATION | EJECTION FAILURE TYPE INFORMATION | COMPLEMENT DESTINATION NOZZLE INFORMATION | |
|---|---|---|---|
| N[a1] | UNRECOVERABLE EJECTION FAILURE | N[c1] | RC-1 |
| N[b4] | UNRECOVERABLE EJECTION FAILURE | N[a4] | RC-2 |
| N[d4] | RECOVERABLE EJECTION FAILURE | UNDETERMINED | RC-3 |

| EJECTION FAILURE NOZZLE INFORMATION | EJECTION FAILURE TYPE INFORMATION | COMPLEMENT DESTINATION NOZZLE INFORMATION | |
|---|---|---|---|
| N[a1] | RECOVERABLE EJECTION FAILURE | UNDETERMINED → N[c1] | ~ RC-1 |
| N[b4] | RECOVERABLE EJECTION FAILURE | UNDETERMINED → N[a4] | ~ RC-2 |
| N[d4] | RECOVERABLE EJECTION FAILURE | UNDETERMINED → N[c4] | ~ RC-3 |

TNI

FIG. 20

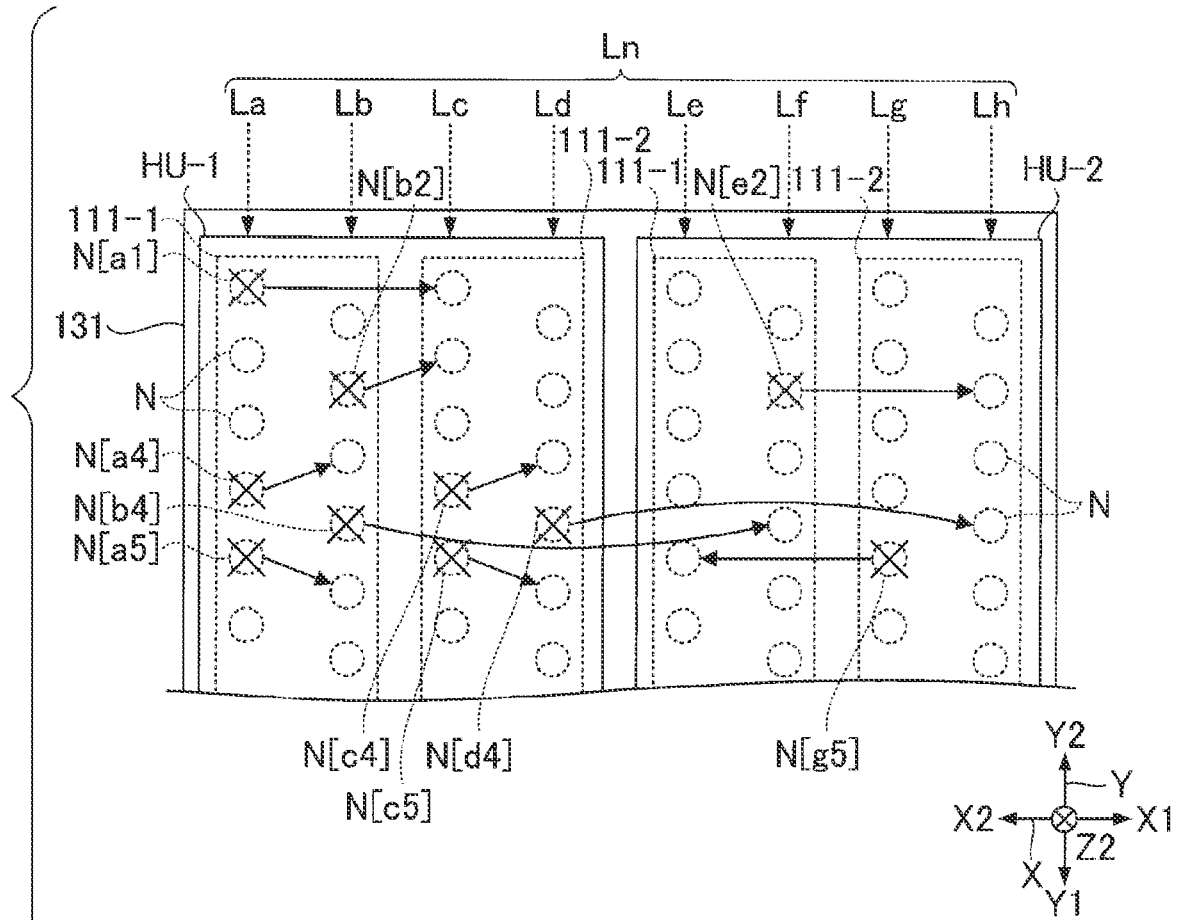

| EJECTION FAILURE NOZZLE INFORMATION | EJECTION FAILURE TYPE INFORMATION | COMPLEMENT DESTINATION NOZZLE INFORMATION | |
|---|---|---|---|
| N[a1] | UNRECOVERABLE EJECTION FAILURE | N[c1] | TNI |
| N[b2] | UNRECOVERABLE EJECTION FAILURE | N[c2] | RC-1 |
| N[b4] | UNRECOVERABLE EJECTION FAILURE | N[f4] | RC-2 |
| N[d4] | UNRECOVERABLE EJECTION FAILURE | N[h4] | RC-3 |
| N[f2] | UNRECOVERABLE EJECTION FAILURE | N[h2] | RC-4 |
| N[g5] | UNRECOVERABLE EJECTION FAILURE | N[e5] | RC-5 |
| N[a4] | UNRECOVERABLE EJECTION FAILURE | N[b3] | RC-6 |
| N[a5] | UNRECOVERABLE EJECTION FAILURE | N[b5] | RC-7 |
| N[c4] | UNRECOVERABLE EJECTION FAILURE | N[d3] | RC-8 |
| N[c5] | UNRECOVERABLE EJECTION FAILURE | N[d5] | RC-9 |
|  |  |  | RC-10 |

FIG. 21

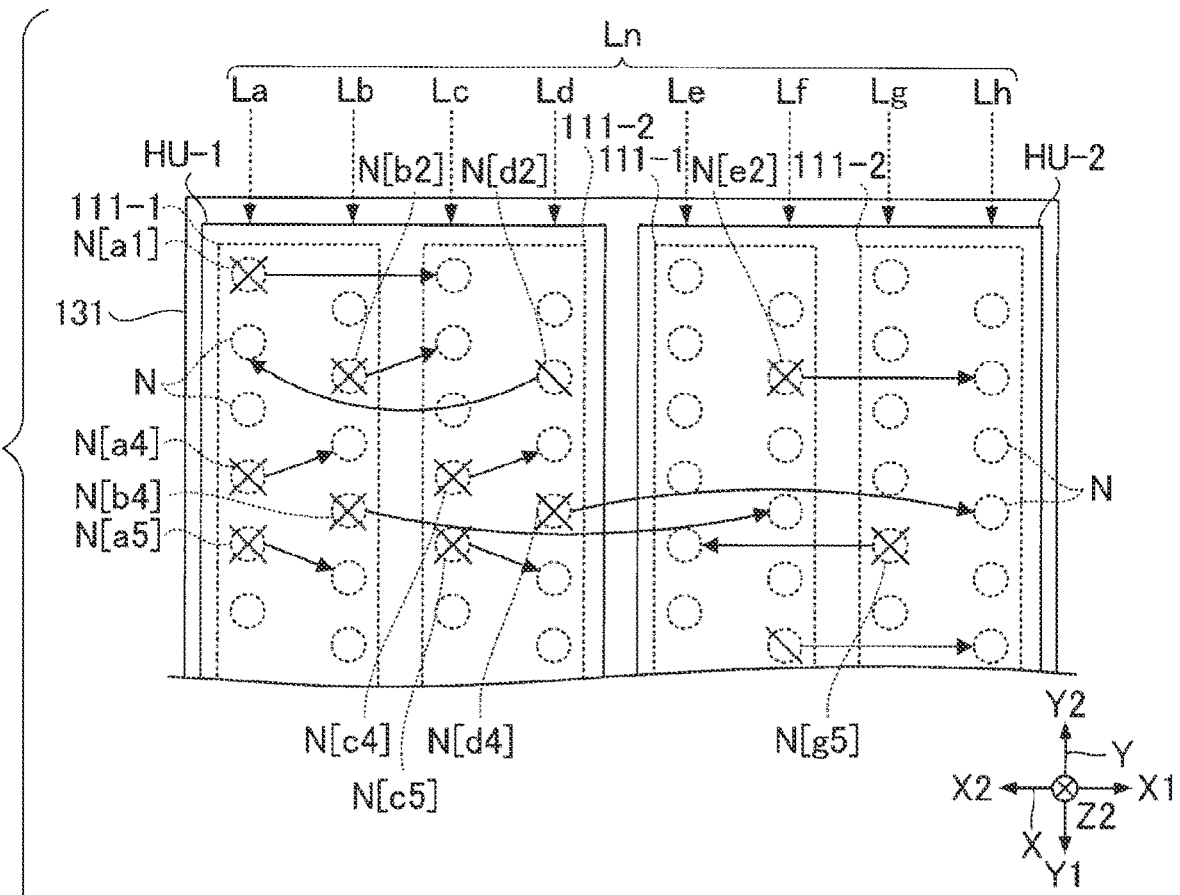

| EJECTION FAILURE NOZZLE INFORMATION | EJECTION FAILURE TYPE INFORMATION | COMPLEMENT DESTINATION NOZZLE INFORMATION | |
|---|---|---|---|
| | | | TNI |
| N[a1] | UNRECOVERABLE EJECTION FAILURE | N[c1] | RC-1 |
| N[b2] | UNRECOVERABLE EJECTION FAILURE | N[c2] | RC-2 |
| N[b4] | UNRECOVERABLE EJECTION FAILURE | N[f4] | RC-3 |
| N[d4] | UNRECOVERABLE EJECTION FAILURE | N[h4] | RC-4 |
| N[f2] | UNRECOVERABLE EJECTION FAILURE | N[h2] | RC-5 |
| N[g5] | UNRECOVERABLE EJECTION FAILURE | N[e5] | RC-6 |
| N[a4] | UNRECOVERABLE EJECTION FAILURE | N[b3] | RC-7 |
| N[a5] | UNRECOVERABLE EJECTION FAILURE | N[b5] | RC-8 |
| N[c4] | UNRECOVERABLE EJECTION FAILURE | N[d3] | RC-9 |
| N[c5] | UNRECOVERABLE EJECTION FAILURE | N[d5] | RC-10 |
| N[d2] | RECOVERABLE EJECTION FAILURE | UNDETERMINED → N[a2] | RC-11 |
| N[f6] | RECOVERABLE EJECTION FAILURE | UNDETERMINED → N[h6] | RC-12 |

FIG. 22

INK JET SYSTEM FOR CORRECTING EJECTION FAILURES

The present application is based on, and claims priority from JP Application Serial Number 2022-182699, filed Nov. 15, 2022, the disclosure of which is hereby incorporated by reference herein in its entirety.

BACKGROUND

1. Technical Field

The present disclosure relates to an ink jet system.

2. Related Art

In the related art, a recording apparatus such as an ink jet printer that is equipped with a head unit that ejects ink and executes recording processing on a recording medium such as printing paper has been provided. For example, JP-A-2015-157426 discloses an ink jet system including a recording apparatus and a processing apparatus that executes data processing for causing the recording apparatus to execute recording processing.

In addition, in the head unit, due to thickening of the ink or the like, an ejection failure may occur in which the ink cannot be ejected normally. When an ejection failure occurs in the head unit, dots formed at a recording medium cannot be accurately formed, and the quality of an image formed at the recording medium is deteriorated. In order to suppress a deterioration in image quality caused by an ejection failure of a head unit, for example, JP-A-2015-157426 discloses that a recording apparatus executes correction processing for correcting an ejection failure when an ejection abnormality occurs in a head unit.

In order to reduce a load applied on the processing apparatus and the recording apparatus with respect to the above-described related art, it is conceivable that any one of the processing apparatus and the recording apparatus is connected to a server and the server executes the correction processing. However, when the server always executes the correction processing, the period required for recording on the recording medium is extended by waiting for a response from the server. Therefore, it has been difficult to reduce the load applied on the processing apparatus and the recording apparatus while executing the correction processing.

SUMMARY

According to an aspect of the present disclosure, there is provided an ink jet system including: a recording apparatus that is equipped with a head unit that ejects ink and executes recording processing for recording on a recording medium; a processing apparatus that is coupled to the recording apparatus and executes data processing for causing the recording apparatus to execute the recording processing; and a server configured to be connected to any one of the recording apparatus and the processing apparatus, in which, when an ejection failure of the head unit is a first ejection failure that is resolved by executing predetermined recovery processing, either the recording apparatus or the processing apparatus executes first correction processing, and when the ejection failure of the head unit is a second ejection failure that is not resolved by executing the predetermined recovery processing, the server executes second correction processing.

According to another aspect of the present disclosure, there is provided an ink jet system including: a recording apparatus that is equipped with a head unit that ejects ink and executes recording processing for recording on a recording medium; a processing apparatus that is coupled to the recording apparatus and executes data processing for causing the recording apparatus to execute the recording processing; and a server configured to be connected to any one of the recording apparatus and the processing apparatus, in which, when an ejection failure of the head unit is a first ejection failure, either the recording apparatus or the processing apparatus executes first correction processing, when the ejection failure of the head unit is a second ejection failure, the server executes second correction processing, and a frequency at which the first correction processing is executed is higher than a frequency at which the second correction processing is executed.

BRIEF DESCRIPTION OF THE DRAWINGS

FIG. 8 is an enlarged cross-sectional diagram showing the vicinity of a piezoelectric element.

FIG. 11 is an explanatory diagram for describing a generation of coupling state designation signals.

FIG. 13 is a diagram showing an example of the contents of an ejection failure nozzle table.

FIG. 20 is a diagram for describing an example of complement destination nozzle determination processing executed by a cloud server.

FIG. 21 is a diagram for describing an example of complement destination nozzle determination processing in a second recording instruction.

FIG. 22 is a diagram for describing an example of waveform determination processing.

DESCRIPTION OF EMBODIMENTS

Embodiments for carrying out the present disclosure will be described below with reference to the drawings. Here, in each drawing, the dimensions and scales of each section are appropriately different from the actual ones. In addition, the embodiments described below are preferred specific examples of the present disclosure, and therefore, various technically preferable limitations are given, but the scope of the present disclosure is not limited to these forms unless there is a description to the effect that the present disclosure is particularly limited in the following description.

1. First Embodiment

1-1. Overview of Ink Jet System 10

Figure 1:
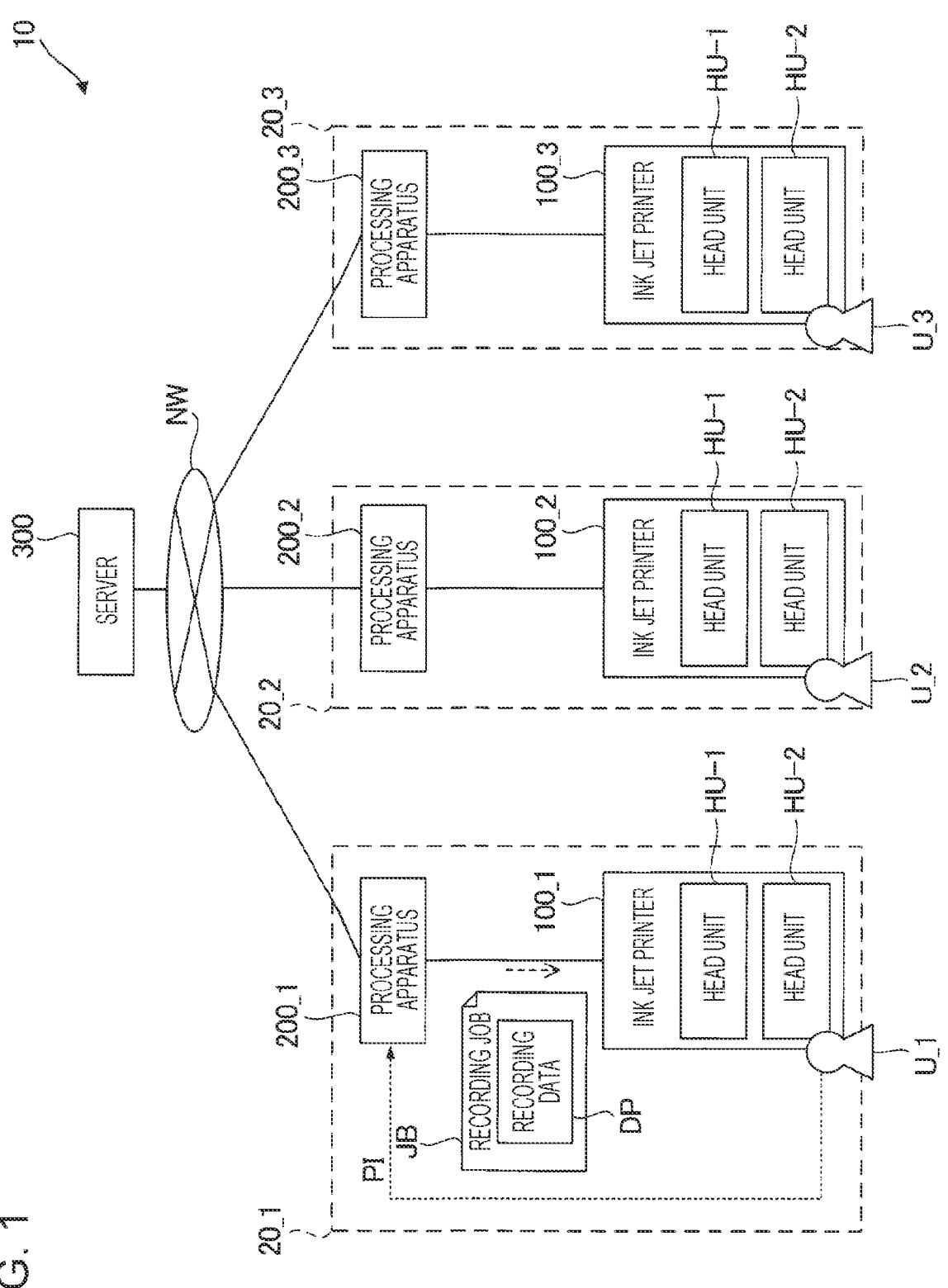
FIG. 1 is a schematic diagram showing a configuration example of an ink jet system according to a first embodiment.

FIG. 1 is a schematic diagram showing a configuration example of an ink jet system 10 according to a first embodiment. The ink jet system 10 is a system that performs recording on a recording medium PP, which will be described later, by an ink jet method. In the example shown in FIG. 1, the ink jet system 10 includes ink jet printers 100_1 to 100_3, processing apparatuses 200_1 to 200_3 and a server 300.

Here, the ink jet printers 100_1 to 1003 are apparatuses provided by a manufacturer of the ink jet printers 100_1 to 100_3. In the following description, the ink jet printers 100_1 to 1003 may be collectively referred to as the ink jet printer 100 without distinguishing among them. The ink jet printer 100 is a liquid ejecting apparatus that ejects ink, which is an example of a liquid. A manufacturer of the ink jet printer 100 is a company that manufactures the ink jet printer 100. The manufacturer of the ink jet printer 100 may be referred to as a "printer manufacturer". Each of the ink jet printers 100_1 to 1003 may be provided by the same printer manufacturer or may be provided by different printer manufacturers. However, head units HU incorporated in the ink jet printers 100_1 to 100_3 are provided by a manufacturer of the head units HU. A manufacturer of the head units HU is a company that manufactures the head units HU. Hereinafter, the manufacturer of the head units HU may be referred to as a "head manufacturer". The printer manufacturer receives the provision of the head unit HU from the head manufacturer, and manufactures the ink jet printer 100 by incorporating the provided head unit HU into the ink jet printer 100. The ink jet printer 100 is an example of a "recording apparatus".

FIG. 1 shows a user U_1 who uses the ink jet printer 1001, a user U_2 who uses the ink jet printer 100_2, and a user U_3 who uses the ink jet printer 100_3. In the following description, the users U_1 to U_3 may be collectively referred to as the user U without distinguishing each of the users U_1 to U_3. For the user U, for example, when a worker belonging to a printer manufacturer uses the ink jet printer 100, this worker is the user U. Further, for example, when a third party who has received the provision of the ink jet printer 100 from the printer manufacturer uses the ink jet printer 100, this third party is the user U. In the following description, the third party who has received the provision of the ink jet printer 100 from the printer manufacturer may be referred to as an "end user". For each integer i from 1 to 3, a user U_i uses a processing apparatus 200_i in addition to an ink jet printer 100_i.

The ink jet printer 100_1 is communicatively connected to the processing apparatus 200_1. The ink jet printer 1002 is communicatively connected to the processing apparatus 200_2. The ink jet printer 100_3 is communicatively connected to the processing apparatus 200_3. In this way, the ink jet printers 100_1 to 100_3 correspond to the processing apparatuses 200_1 to 2003, respectively, and are communicatively connected to the processing apparatuses 200_1 to 200_3. In the following description, the processing apparatuses 200_1 to 200_3 may be collectively referred to as the processing apparatus 200 without distinguishing each of the processing apparatuses 200_1 to 200_3.

Further, in the following, a recording system 20_i may be described for each integer i from 1 to 3. The recording system 20_i includes the ink jet printer 100_i and the processing apparatus 200_i. In the following description, recording systems 20_1 to 20_3 may be collectively referred to as a recording system 20 without distinguishing each of the recording systems 20_1 to 20_3. It can be said that the ink jet system 10 includes the recording systems 20_1 to 20_3 and the server 300.

In the example shown in FIG. 1, the number of each of the ink jet printers 100 and the processing apparatuses 200 included in the ink jet system 10 is three, but the number is not limited thereto, and may be one, two, or four or more. That is, the number of pairs of the ink jet printer 100 and the processing apparatus 200 is not limited to three, and may be one, two, or four or more.

The ink jet printer 100 performs recording on the recording medium PP by the ink jet method, that is, by ejecting ink onto the recording medium PP. By performing recording on the recording medium PP, an image is formed at the recording medium PP. Hereinafter, processing for forming an image at the recording medium PP by ejecting ink onto the recording medium PP will be referred to as "recording processing". The ink jet printer 100 receives a recording job JB for executing recording processing from the processing apparatus 200. The recording job JB includes identification information (not shown) that uniquely identifies the recording job JB, and recording data DP that indicates an image formed at the recording medium PP. Moreover, the recording job JB may include information indicating the number of copies of an image formed at the recording medium PP. The recording job JB is generated by the processing apparatus 200 when the processing apparatus 200 is notified of the recording instruction PI by the operation of the user U. The recording instruction PI includes information that identifies image data that is a source of the recording data DP. The image data is data in a file format such as PostScript, PDF, or XPS. PDF is an abbreviation for Portable Document Format. XPS is an abbreviation for XML Paper Specification. The information that identifies the image data is, for example, a file path of the image data stored in the processing apparatus 200. The ink jet printer 100 forms an image based on the recording data DP at the recording medium PP.

The recording medium PP is not particularly limited as long as it is a medium on which the ink jet printer 100 can print, and is, for example, various types of paper, various cloths, various films, and the like. Further, when the recording medium PP is paper, the recording medium PP may be a long roll paper or may be one or more sheets of printing paper of A size or the like. In the following description, the recording medium PP will be described as a plurality of sheets of printing paper.

The ink jet printer 100 includes a head unit HU-1 and a head unit HU-2 as two head units HU. In the following description, the head unit HU-1 and the head unit HU-2 may be collectively referred to as the "head unit HU". The head unit HU ejects ink from a nozzle N provided in the head unit HU. Hereinafter, among the elements constituting the ink jet printer 100, the elements excluding the head unit HU may be referred to as a "printer main body".

In the example shown in FIG. 1, the ink jet printer 100 includes two head units HU, but the number of head units HU is not limited to two and may be one or three or more.

The processing apparatus 200 is a desktop or laptop computer. The processing apparatus 200 executes data processing for generating the recording data DP and recording processing control processing for controlling the recording processing by the ink jet printer 100. The data processing is various types of processing such as RIP processing or color conversion processing. RIP is an abbreviation for Raster Image Processor. The processing apparatus 200 generates the recording data DP by executing data processing on the image data identified by the recording instruction PI.

The processing apparatus 200 is communicatively connected to the server 300 via a network NW such as a LAN, a WAN, and the Internet. LAN is an abbreviation for Local Area Network. WAN is an abbreviation for Wide Area Network.

The server 300 is a computer that functions as a cloud server CS, which will be described later. The server 300 is managed by, for example, a head manufacturer, a printer manufacturer, and a provider different from the end user. Hereinafter, the provider that manages the server 300 may be referred to as a "server provider". The head manufacturer uses a part of the server 300.

1-2. Configuration of Server 300

Figure 2:
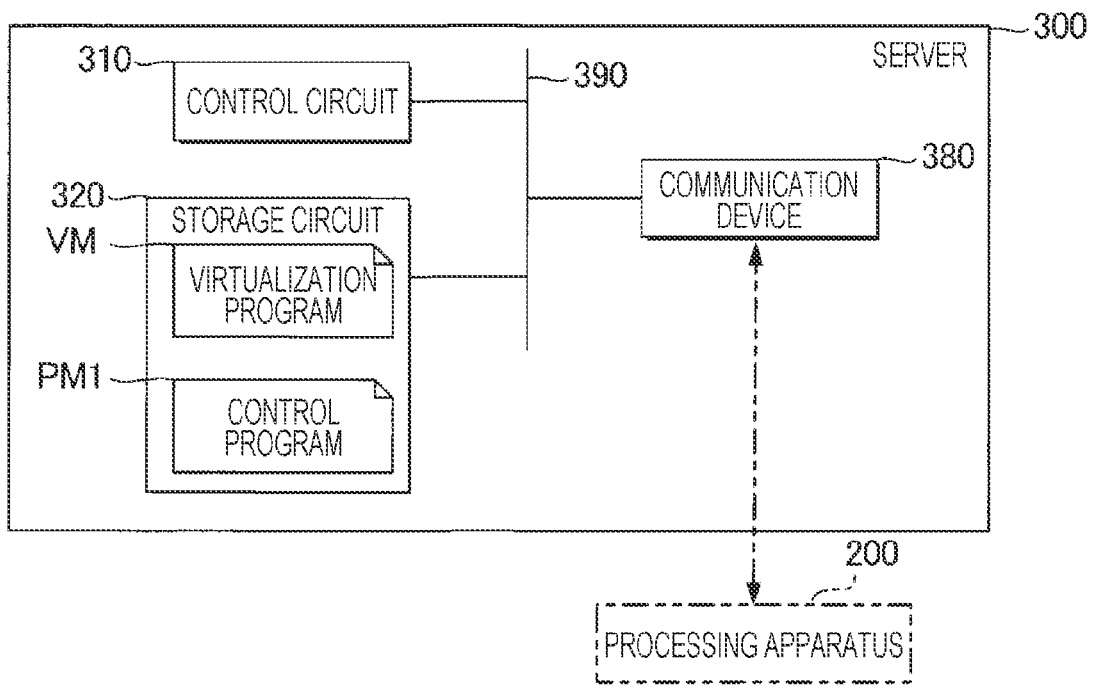
FIG. 2 is a diagram showing an example of a configuration of a server.

FIG. 2 is a diagram showing an example of a configuration of the server 300. The server 300 includes a control circuit 310, a storage circuit 320, and a communication device 380. The control circuit 310, the storage circuit 320, and the communication device 380 are coupled to one another via a bus 390 for communicating information.

The control circuit 310 includes, for example, a processor such as one or more CPUs. CPU is an abbreviation for Central Processing Unit. The control circuit 310 may include a programmable logic device such as an FPGA instead of or in addition to the CPU. FPGA is an abbreviation for Field Programmable Gate Array.

The storage circuit 320 is composed of a magnetic storage device, a flash ROM, or the like. The storage circuit 320 is a recording medium that can be read by the control circuit 310, and stores a plurality of programs including a virtualization program VM and a control program PM1 executed by the control circuit 310, various types of information used by the control circuit 310, and the like. The virtualization program VM divides resources such as the control circuit 310 and the storage circuit 320 of the server 300 into a plurality of resources, and operates each of the divided resources as the cloud server CS. The head manufacturer uses some cloud servers CS among a plurality of cloud server CS as a part of the server 300. The control program PM1 is developed by the head manufacturer.

However, the storage circuit 320 may not have the virtualization program VM, and the processing apparatus 200 may access the server 300 instead of the cloud server CS.

The storage circuit 320 includes, for example, one or both semiconductor memories of one or more volatile memories such as a RAM and one or more non-volatile memories such as a ROM, an EEPROM, or a PROM. RAM is an abbreviation for Random Access Memory. ROM is an abbreviation for Read Only Memory. EEPROM is an abbreviation for Electrically Erasable Programmable Read-Only Memory. PROM is an abbreviation for Programmable ROM.

The communication device 380 is hardware having a communication circuit for communicating with the processing apparatus 200 via the network NW. The communication device 380 is also referred to as a network device, a network controller, a network card, or a communication module, for example.

1-3. Configuration of Processing Apparatus 200

Figure 3:
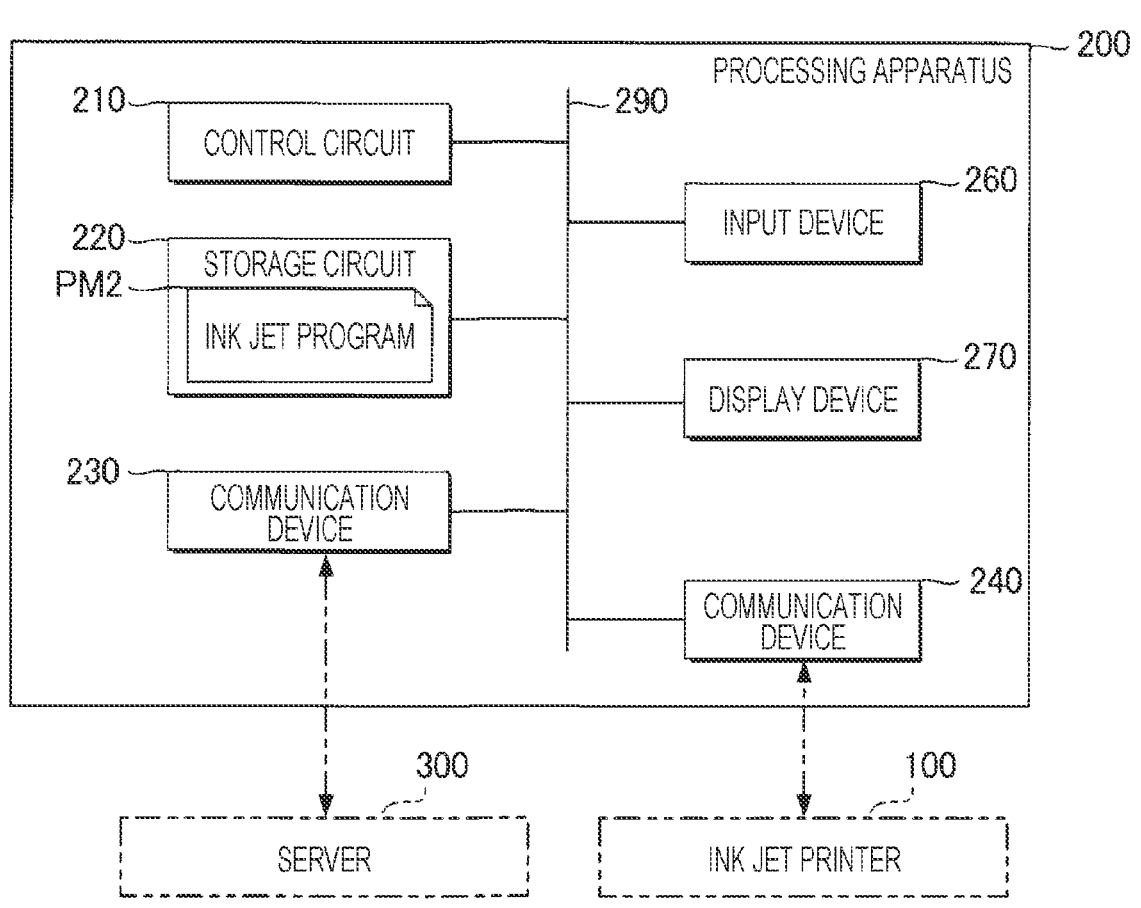
FIG. 3 is a diagram showing a configuration of a processing apparatus.

FIG. 3 is a diagram showing a configuration of the processing apparatus 200. The processing apparatus 200 includes a control circuit 210, a storage circuit 220, a communication device 230, a communication device 240, an input device 260, and a display device 270. The control circuit 210, the storage circuit 220, the communication device 230, the communication device 240, the input device 260, and the display device 270 are coupled to one another via a bus 290 for communicating information.

The control circuit 210 includes, for example, a processor such as one or more CPUs. The control circuit 210 may include a programmable logic device such as an FPGA instead of or in addition to the CPU.

The storage circuit 220 is composed of a magnetic storage device, a flash ROM, or the like. The storage circuit 220 is a recording medium that can be read by the control circuit 210, and stores a plurality of programs including an ink jet program PM2 executed by the control circuit 210, various types of information used by the control circuit 210, and the like. The storage circuit 220 includes, for example, one or both semiconductor memories of one or more volatile memories such as a RAM and one or more non-volatile memories such as a ROM, an EEPROM, or a PROM. When the processing apparatus 200 is coupled to the ink jet printer 100, the ink jet program PM2 is downloaded from the cloud server CS operating on the server 300 and installed in the processing apparatus 200, for example.

The communication device 230 is hardware having a communication circuit for communicating with the processing apparatus 200 via the network NW. The communication device 230 is also referred to as a network device, a network controller, a network card, or a communication module, for example.

The communication device 240 is a circuit capable of communicating with the ink jet printer 100. For example, the communication device 240 is a network card such as USB or Bluetooth. USB is an abbreviation for Universal Serial Bus. USB and Bluetooth are registered trademarks. Generally, a communication speed between the processing apparatus 200 and the server 300 is slower than a communication speed between the processing apparatus 200 and the ink jet printer 100.

The input device 260 is a device that outputs operation information according to the operation of the user U. The input device 260 is, for example, a mouse and a keyboard.

The display device 270 displays an image indicating some information to the user U. The display device 270 is an organic EL display, an LED display, and an LCD. EL is an abbreviation for Electro-Luminescence. LED is an abbreviation for Light Emitting Diode. LCD is an abbreviation for Liquid Crystal Display. Alternatively, a configuration in which the input device 260 and the display device 270 are integrated may be used. The configuration in which the input device 260 and the display device 270 are integrated is, for example, a touch panel.

As shown in FIGS. 1 to 3, there is a business model in which the head manufacturer provides the head unit HU to the printer manufacturer, and the printer manufacturer manufactures the ink jet printer 100 by incorporating the head unit HU into the printer main body. In this business model, printer manufacturers generally design and manufacture components other than the head unit HU. On the other hand, in the present embodiment, the head manufacturer prepares the cloud server CS and the ink jet program PM2 that operates on the processing apparatus 200, and the user U connects the processing apparatus 200 to the cloud server CS and causes the processing apparatus 200 to operate the ink jet program PM2. As described above, in the present embodiment, since the printer manufacturer does not need to prepare the ink jet program PM2, the load of the printer manufacturer for designing and manufacturing components can be reduced.

1-4. Configuration of Ink Jet Printer 100

Figure 4:
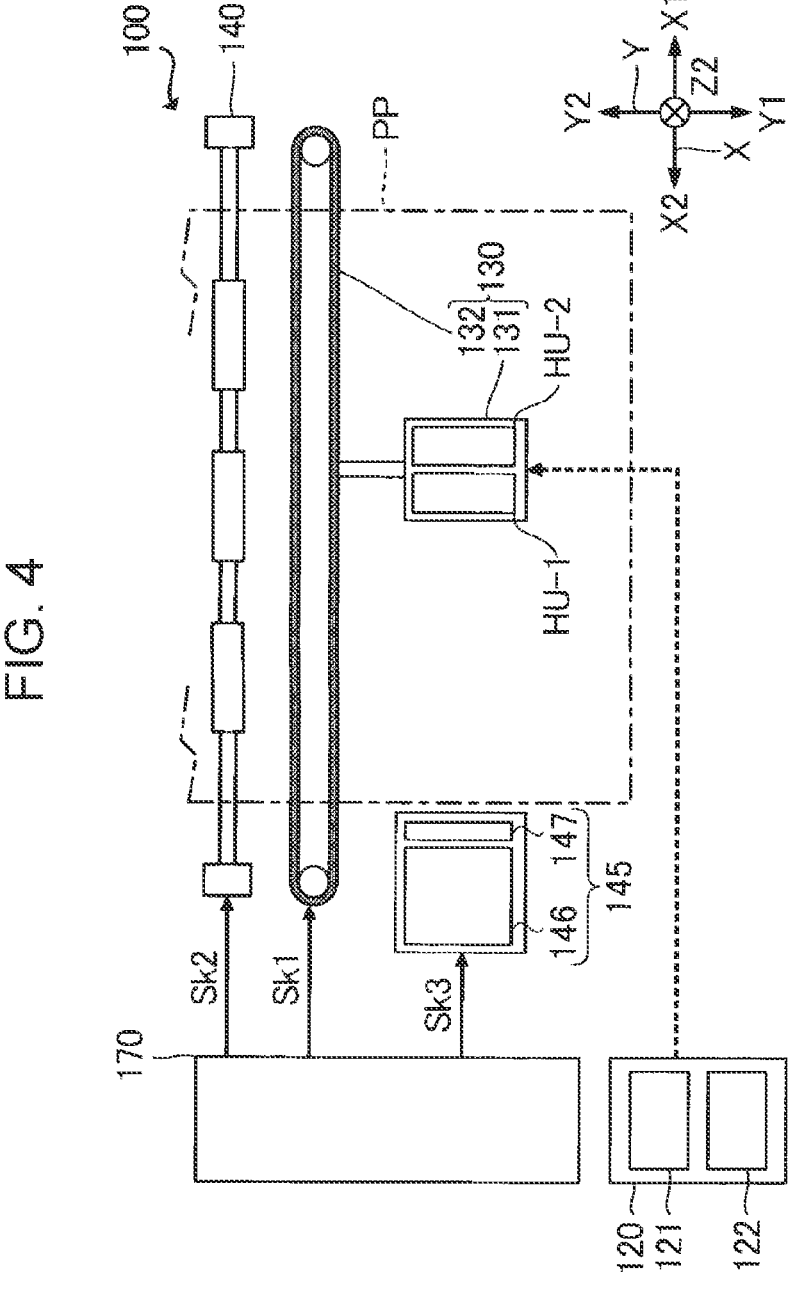
FIG. 4 is a schematic diagram illustrating an example of a configuration of an ink jet printer.
Figure 5:
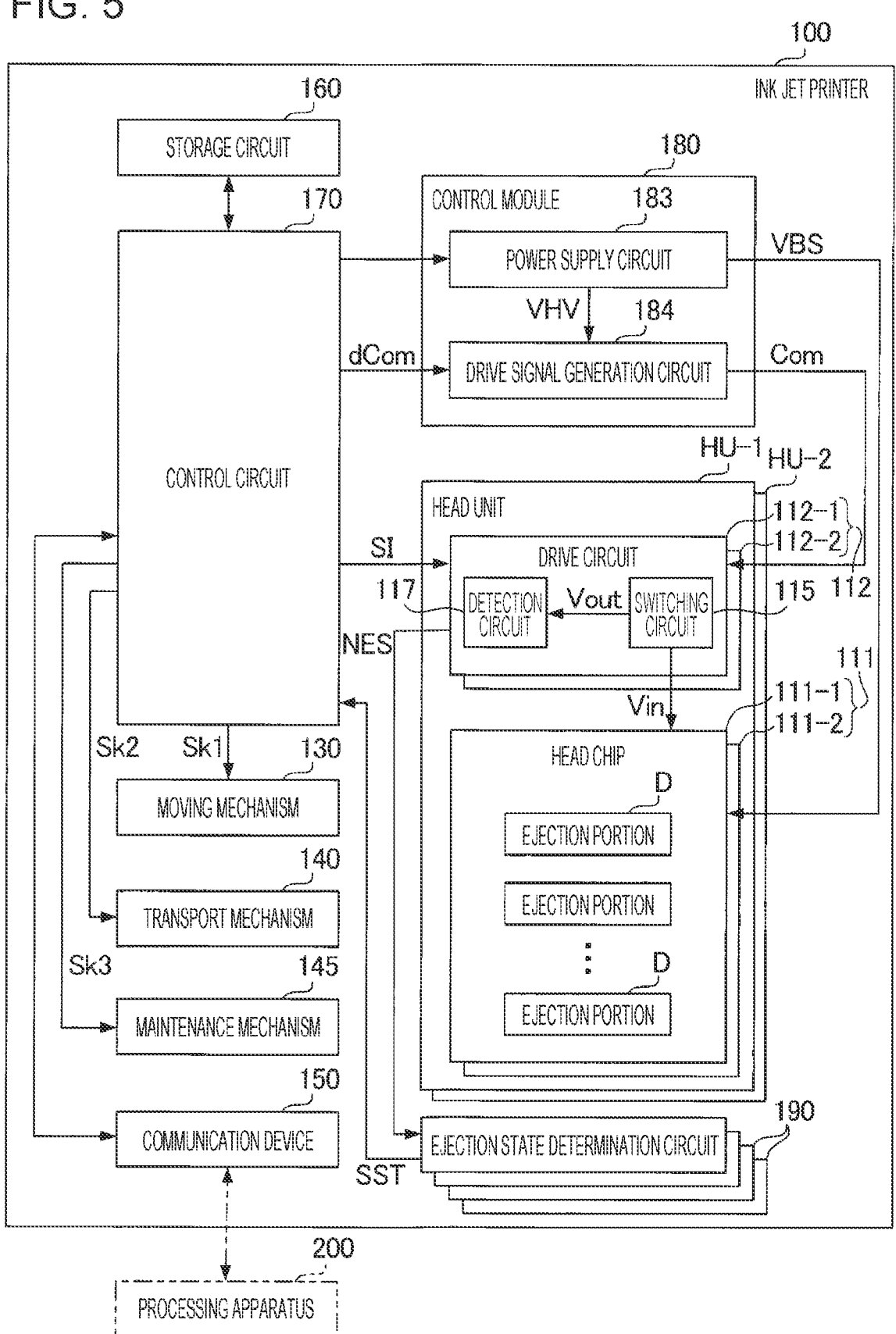
FIG. 5 is a block diagram showing a configuration example of the ink jet printer.

FIG. 4 is a schematic diagram illustrating an example of a configuration of the ink jet printer 100. FIG. 5 is a block diagram showing a configuration example of the ink jet printer 100. In the following description, an X-axis, a Y-axis, and a Z-axis which are orthogonal to each other are assumed. One direction along the X-axis when viewed from an optional point is referred to as an X1 direction, and a direction opposite to the X1 direction is referred to as an X2 direction. Similarly, directions opposite to each other along the Y-axis from an optional point are referred to as a Y1 direction and a Y2 direction, and directions opposite to each other along the Z-axis from an optional point are referred to as a Z1 direction and a Z2 direction. An X-Y plane including the X-axis and the Y-axis corresponds to a horizontal plane. The Z-axis is an axis along a vertical direction, and the Z2 direction corresponds to a downward direction in the vertical direction.

The ink jet printer 100 according to the first embodiment is a serial type liquid ejecting apparatus that reciprocates the head unit HU along the X-axis. Specifically, as shown in FIG. 4, the ink jet printer 100 ejects ink from the nozzle N by transporting the recording medium PP in the Y1 direction, which is a sub-scanning direction, and moving the head unit HU in the X1 direction and the X2 direction, which are main scanning directions, thereby executing recording processing for forming an image at the recording medium PP. In the following description, moving the head unit HU once in the main scanning direction is referred to as one pass. The ink jet printer 100 forms an image at the recording medium PP by repeating processing for moving the head unit HU during one pass to form a partial image corresponding to one pass on the recording medium PP, and processing for transporting the recording medium PP by the amount corresponding to one pass.

As shown in FIGS. 4 and 5, the ink jet printer 100 includes the head unit HU, a liquid container 120, a moving mechanism 130, a transport mechanism 140, a maintenance mechanism 145, a communication device 150, a storage circuit 160, a control circuit 170, and an ejection state determination circuit 190.

The head unit HU is an assembly having a head chip 111, a drive circuit 112, a power supply circuit 183, and a drive signal generation circuit 184.

In the example shown in FIG. 5, the head unit HU includes the head chip 111 and the drive circuit 112. A part or all of a control module 180 may be incorporated in the head unit HU. The control module 180 includes the power supply circuit 183 and the drive signal generation circuit 184.

The head chip 111 ejects ink toward the recording medium PP. In FIG. 5, some ejection portions D of 2M ejection portions D that are a part of the components of the head chip 111 are representatively illustrated. In the present embodiment, M is an even number of 2 or more. Here, M may be 1. One ejection portion D includes one nozzle N. A detailed example of the head chip 111 will be described later with reference to FIG. 7.

In the example shown in FIG. 5, the number of head chips 111 included in the head unit HU is two, but the number of head chips 111 may be one or three or more. One or more head chips 111 are arranged such that the plurality of nozzles N are distributed over a part of the X-axis which is the width direction of the recording medium PP. One head unit HU includes a head chip 111-1 and a head chip 111-2. Hereinafter, the head chip 111-1 and the head chip 111-2 may be collectively referred to as the head chip 111.

Figure 6:
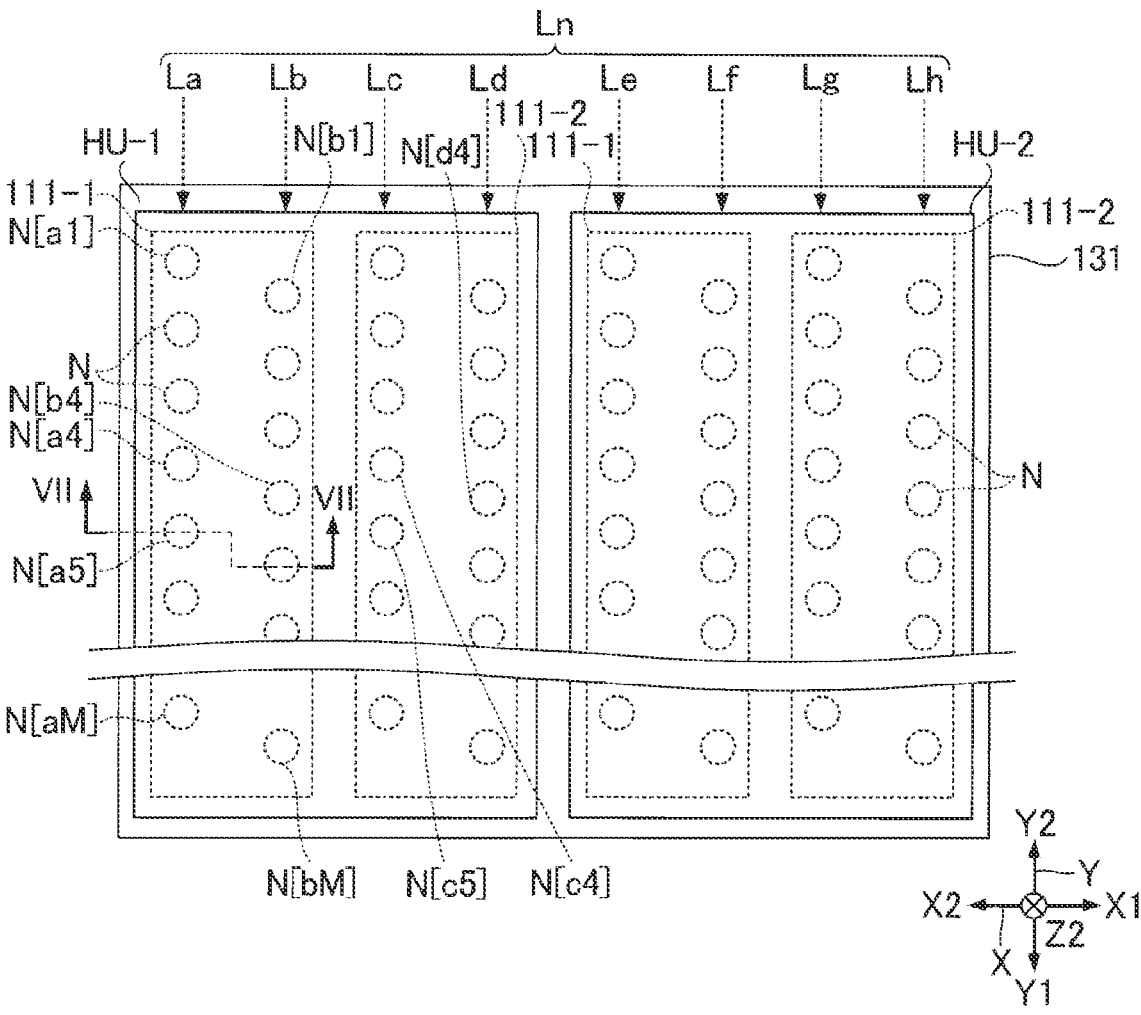
FIG. 6 is a diagram for describing an arrangement of a head chip and a nozzle.

FIG. 6 is a diagram for describing the arrangement of the head chip 111 and the nozzle N. FIG. 6 is a diagram of two head units HU viewed in the Z1 direction to the Z2 direction. Here, in FIG. 6, in order to show the arrangement of the nozzle N, the contours of the nozzle N and the head chip 111 are shown by a broken line.

As shown in FIG. 6, the head unit HU-1 and the head unit HU-2 are arranged along the X-axis. Further, two head chips 111 of the head unit HU-1 and two head chips 111 of the head unit HU-2 are arranged along the X-axis. As shown in FIG. 6, the head chips 111 of the head unit HU-1 and the head unit HU-2 have 2M nozzles N arranged in a direction along the Y-axis. The 2M nozzles N are divided into two rows arranged at intervals in a direction along the X-axis. Hereinafter, a set of nozzles N arranged linearly may be referred to as a "nozzle row Ln". Of the 2M nozzles N included in one head chip 111, M nozzles N are divided into one nozzle row Ln of two nozzle rows Ln, and the remaining M nozzles N are divided into the other nozzle row Ln.

Hereinafter, of the two head chips 111 of the head unit HU-1, the nozzle row Ln located in the X2 direction of the head chips 111-1 arranged in the X2 direction may be referred to as a "nozzle row La", and the nozzle row Ln located in the X1 direction may be referred to as a "nozzle row Lb". Further, of the two head chips 111 of the head unit HU-1, the nozzle row Ln located in the X2 direction of the head chips 111-2 arranged in the X1 direction may be referred to as a "nozzle row Lc", and the nozzle row Ln located in the X1 direction may be referred to as a "nozzle row Ld". Of the two head chips 111 of the head unit HU-2, the nozzle row Ln located in the X2 direction of the head chips 111-1 arranged in the X2 direction may be referred to as a "nozzle row Le", and the nozzle row Ln located in the X1 direction may be referred to as a "nozzle row Lf". Further, of the two head chips 111 of the head unit HU-2, the nozzle row Ln located in the X2 direction of the head chips 111-2 arranged in the X1 direction may be referred to as a "nozzle row Lg", and the nozzle row Ln located in the X1 direction may be referred to as a "nozzle row Lh".

Hereinafter, in order to distinguish each of the 2M ejection portions D provided on one head chip 111, each of the 2M ejection portions D may be referred to as a first stage, a second stage, . . . , a 2M-th stage. Further, the ejection portion D divided into the nozzle row Ln and corresponding to an m-th stage may be referred to as an ejection portion D[nm]. n is a character representing any one of a, b, c, d, e, f, g, and h. m is an integer satisfying 1 or more and M or less. In addition, when the components, signals, and the like of the head unit HU correspond to the nozzle row Ln of the ejection portion D[nm] and the number of stages m, the symbols for representing the components, signals, and the like may be expressed with a suffix [nm] indicating that the components, signals, and the like correspond to the nozzle row Ln and the number of stages m. In addition, in order to simplify the description, the suffix [nm] may be described as [n1m1] to [n2m2]. n1 and n2 are characters representing any one of a, b, c, d, e, f, g, and h. m1 and m2 are integers satisfying 1 or more and M or less. For example, ejection portions D[a1] to D[bM] refer to M ejection portions D from an ejection portion D[a1] to an ejection portion D[aM] and M ejection portions D from an ejection portion D[b1] to an ejection portion D[bM].

In the present embodiment, of the M nozzles N divided into one nozzle row Ln, the nozzle N arranged closest to the Y2 direction is denoted as a nozzle N[n1], and the nozzle N arranged closest to the Y1 direction is denoted as a nozzle N[nM]. More specifically, of the M nozzles N divided into one nozzle row La, the nozzle N arranged closest to the Y2 direction is denoted as a nozzle N[a1], and the nozzle N arranged closest to the Y1 direction is denoted as a nozzle N[aM]. Further, of the M nozzles N divided into one nozzle row Lb, the nozzle N arranged closest to the Y2 direction is denoted as a nozzle N[b1], and the nozzle N arranged closest to the Y1 direction is denoted as a nozzle N[bM].

As can be understood from FIG. 6, the positions of M nozzles N divided into one nozzle row Ln and M nozzles N divided into the other nozzle row Ln of two nozzle rows Ln provided in one head chip 111 in the direction along the Y-axis are different from each other. In the following description, with respect to a certain nozzle N, a nozzle N at the same position on the Y-axis may be referred to as a "nozzle N at the same position", and a nozzle N that is located at a different position on the Y-axis but is closest to the certain nozzle N may be referred to as a "nozzle N at an adjacent position". For example, of the nozzles N that eject the first type of ink, the nozzle N at the same position as a nozzle N[b4] is a nozzle N[d4], and the nozzles N at an adjacent position to the nozzle N[b4] are a nozzle N[a4], a nozzle N[a5], a nozzle N[c4], and a nozzle N[c5]. However, the positions of the M nozzles N divided into one nozzle row Ln and the M nozzles N divided into the other nozzle row Ln in the direction along the Y-axis may be the same.

The description will now return to FIGS. 4 and 5. The head unit HU includes the same number of drive circuits 112 as the head chips 111. In the example of FIG. 5, since the head unit HU includes two head chips 111, the head unit HU includes two drive circuits 112, namely, a drive circuit 112-1 coupled to the head chip 111-1 and a drive circuit 112-2 coupled to the head chip 111-2. Hereinafter, the drive circuit 112-1 and the drive circuit 112-2 may be collectively referred to as the drive circuit 112.

The drive circuit 112 includes a switching circuit 115 and a detection circuit 117. Under the control of the control circuit 170, the switching circuit 115 switches whether or not to supply a drive signal Com output from the drive signal generation circuit 184 to each of the 2M ejection portions D of the head chip 111 coupled to the drive circuit 112. Further, the switching circuit 115 switches whether or not to electrically couple each ejection portion D and the detection circuit 117 to each other. In the present embodiment, it is assumed that the drive signal Com includes a drive signal Com-A and a drive signal Com-B. Further, of the drive signals Com-A and Com-B, a signal actually supplied to the ejection portion D[nm] may be referred to as a supply drive signal ViN[nm]. The switching circuit 115 includes, for example, a group of switches such as a transmission gate for the switching. Details of the switching circuit 115 will be described later with reference to FIG. 7. After the ejection portion D is driven, the detection circuit 117 outputs a residual vibration signal NES indicating the vibration remaining in the ejection portion D to the ejection state determination circuit 190. More specifically, the detection circuit 117 generates a residual vibration signal NES[nm] based on a detection signal Vout[nm] detected from the ejection portion D[nm] driven by the drive signal Com. Hereinafter, the vibration remaining in the ejection portion D will be referred to as "residual vibration".

The power supply circuit 183 receives power supplied from a commercial power supply (not shown) and generates various predetermined potentials. The generated various potentials are appropriately supplied to each section of the ink jet printer 100. In the example shown in FIG. 5, the power supply circuit 183 generates a power supply potential VHV and an offset potential VBS. The offset potential VBS is supplied to the head chip 111 and the like. Also, the power supply potential VHV is supplied to the drive signal generation circuit 184 and the like.

The drive signal generation circuit 184 is a circuit that generates a drive signal Com for driving each ejection portion D of the head chip 111. Specifically, the drive signal generation circuit 184 includes, for example, a DA conversion circuit and an amplifier circuit. In the drive signal generation circuit 184, the DA conversion circuit converts a waveform designation signal dCom to be described later from the control circuit 170 from a digital signal to an analog signal, and the amplifier circuit generates a drive signal Com by amplifying the analog signal using the power supply potential VHV from the power supply circuit 183.

As illustrated in FIG. 4, the liquid container 120 that stores ink is installed in the ink jet printer 100. For example, a cartridge that is detachably attached to the ink jet printer 100, a bag-shaped ink pack formed of a flexible film, or an ink tank that can be replenished with ink is used as the liquid container 120. In the present embodiment, the liquid container 120 will be described on the assumption that two types of ink are stored. The liquid container 120 includes a liquid container 121 that stores the first type of ink and a liquid container 122 that stores the second type of ink. The first type of ink and the second type of ink are ink having different coloring materials from each other, for example. The first type of ink and the second type of ink may be ink of similar colors to each other. Similar colors are colors that have the same or similar hues. Examples of ink of similar colors are cyan ink and light cyan ink. Also, the type of ink contained in the liquid container 120 is not limited to two types, and may be one type or three or more types. For example, the liquid container 120 may store four types of ink, namely, cyan ink, magenta ink, yellow ink, and black ink.

The moving mechanism 130 and the transport mechanism 140 move the relative positions of the recording medium PP and the head unit HU under the control of the control circuit 170. The movement of the relative position may mean moving the head unit HU while the position of the recording medium PP is fixed, or moving the recording medium PP while the position of the head unit HU is fixed. In the present embodiment, in the direction along the X-axis, which is the main scanning direction, the head unit HU is moved in the direction along the X-axis while the position of the recording medium PP on the X-axis is fixed, and in the Y1 direction, which is the sub-scanning direction, the recording medium PP is moved in the Y1 direction while the position of the head unit HU in the direction along the Y-axis is fixed.

The moving mechanism 130 reciprocates the head unit HU along the X-axis under the control of the control circuit 170. As shown in FIG. 4, the moving mechanism 130 includes a substantially box-shaped carriage 131 accommodating the head unit HU and an endless belt 132 to which the carriage 131 is fixed. A configuration in which the liquid container 120 is mounted on the carriage 131 together with the head unit HU may also be employed.

The transport mechanism 140 transports the recording medium PP in the Y1 direction under the control of the control circuit 170. Specifically, the transport mechanism 140 includes a transport roller (not shown) whose rotation axis is parallel to the X-axis, and a motor (not shown) that rotates the transport roller under control by the control circuit 170.

The communication device 150 is a circuit capable of communicating with the processing apparatus 200. For example, the communication device 150 is a network card such as USB or Bluetooth. Also, the communication device 150 may be integrated with the control circuit 170.

The storage circuit 160 stores various programs executed by the control circuit 170 and various types of data such as the recording job JB processed by the control circuit 170. The storage circuit 160 includes, for example, one or both semiconductor memories of one or more volatile memories such as a RAM and one or more non-volatile memories such as a ROM, an EEPROM, or a PROM. The storage circuit 160 may be configured as a part of the control circuit 170.

The control circuit 170 has a function of controlling the operation of each section of the ink jet printer 100 and a function of processing various types of data. The control circuit 170 includes, for example, a processor such as one or more CPUs. The control circuit 170 may include a programmable logic device such as an FPGA instead of or in addition to the CPU.

The control circuit 170 controls the operation of each section of the ink jet printer 100 by executing a program stored in the storage circuit 160. Here, the control circuit 170 generates signals such as a control signal Sk1, a control signal Sk2, a control signal Sk3, a print signal SI, and a waveform designation signal dCom as signals for controlling the operation of each section of the ink jet printer 100.

The control signal Sk1 is a signal for controlling driving of the moving mechanism 130. The control signal Sk2 is a signal for controlling driving of the transport mechanism 140. The control signal Sk3 is a signal for controlling the maintenance mechanism 145. The print signal SI is a signal for controlling driving the drive circuit 112. Specifically, the print signal SI designates, for each predetermined unit period, whether or not the drive circuit 112 supplies the drive signal Com from the drive signal generation circuit 184 to the ejection portion D, and whether or not to output a residual vibration signal NES indicating vibration remaining in the ejection portion D, which will be described later, after the ejection portion D is driven. By this designation, the amount of ink ejected from the head chip 111 and the like are designated. The waveform designation signal dCom is a digital signal for defining the waveform of the drive signal Com generated by the drive signal generation circuit 184.

When the recording processing is executed, the control circuit 170 first causes the storage circuit 160 to store the recording job JB supplied from the processing apparatus 200. Next, the control circuit 170 generates various control signals such as the print signal SI, the waveform designation signal dCom, the control signal Sk1, and the control signal Sk2 based on various types of data such as the recording data DP included in the recording job JB stored in the storage circuit 160. Thereafter, the control circuit 170 controls the head unit HU such that the ejection portion D is driven while controlling the transport mechanism 140 and the moving mechanism 130 so as to change a relative position of the recording medium PP with respect to the head unit HU based on the various control signals and various types of data stored in the storage circuit 160. Accordingly, the control circuit 170 adjusts the presence/absence of ink ejection from the ejection portion D, the ejection amount of ink, the ejecting timing of the ink, and the like, and controls the execution of the recording processing for forming an image based on the recording data DP at the recording medium PP.

Further, when receiving an ejection state determination instruction from the processing apparatus 200, the ink jet printer 100 according to the present embodiment executes ejection state determination processing for determining whether the ejection state of the ink from each ejection portion D is normal or defective. Hereinafter, the ejection failure of the nozzle N included in the ejection portion D may be referred to as an ejection failure of the ejection portion D. Further, when an ejection failure occurs in the ejection portion D included in the head unit HU, it may be referred to as an ejection failure of the head unit HU. Further, the nozzle N in which the ejection failure occurs may be referred to as an "ejection failure nozzle N-T". On the other hand, the nozzle N in which no ejection failure occurs may be referred to as a "normal ejection nozzle N-S". The ejection failure is a state in which, even when an attempt is made to eject the ink from the ejection portion D by driving the ejection portion D by the drive signal Com, the ink cannot be ejected according to the mode defined by the drive signal Com. Here, the ejection mode of the ink defined by the drive signal Com is that the ejection portion D ejects an amount of ink defined by the waveform of the drive signal Com, and the ejection portion D ejects the ink at an ejection speed defined by the waveform of the drive signal Com. That is, the state in which the ink cannot be ejected according to the ejection mode of the ink defined by the drive signal Com includes a state in which an amount of ink smaller than the ejection amount of ink defined by the drive signal Com is ejected from the ejection portion D, a state in which an amount of ink greater than the ejection amount of ink defined by the drive signal Com is ejected from the ejection portion D, a state in which the ink cannot be landed at a desired landing position on the recording medium PP because the ink is ejected at a speed different from the ink ejection speed defined by the drive signal Com, and the like, in addition to a state in which the ink cannot be ejected from the ejection portion D. In the following, the ejection portion D to be determined for the ejection state may be referred to as a determination target ejection portion D-H.

In the ejection state determination processing, the ink jet printer 100 executes a series of processes in which firstly, the control circuit 170 selects the determination target ejection portion D-H from the 2M×4 ejection portions D, secondly, by driving the determination target ejection portion D-H under the control of the control circuit 170, residual vibration is caused in the determination target ejection portion D-H, thirdly, the detection circuit 117 generates a residual vibration signal NES based on the detection signal Vout detected from the determination target ejection portion D-H, and fourthly, the ejection state determination circuit 190 generates determination information SST indicating the determination result of the ejection state based on the residual vibration signal NES.

Further, the ink jet printer 100 according to the embodiment may execute various types of complement processing for compensating for the ejection failure when the ejection failure occurs in the ejection portion D. The complement processing is executed in a state in which an ejection failure occurs even when the supply drive signal Vin determined based on the recording data DP is applied to the ejection portion D.

Further, the ink jet printer 100 according to the present embodiment executes maintenance processing for recovering the ejection failure of the ejection portion D having the ejection failure by the maintenance mechanism 145. The maintenance processing includes flushing processing for discharging ink from the ejection portion D, wiping processing for wiping off foreign matter such as paper dust adhering to the vicinity of the nozzle N of the ejection portion D with a wiper 147, and pumping processing for suctioning the ink, air bubbles, and the like in the ejection portion D with a tube pump. The flushing processing is processing for forcibly removing thickened ink and air bubbles mixed in the ink by repeatedly driving the ejection portion D using the drive signal Com for the flushing processing. The maintenance mechanism 145 includes a cap 146 for covering the head unit HU such that the nozzle N is sealed, the wiper 147, a tube pump (not shown) for sucking the ink, air bubbles, and the like, and a discharged ink receiving portion (not shown) for receiving the discharged ink when the ink is discharged. The maintenance mechanism 145 is provided in a region that does not overlap with the recording medium PP when viewed in the Z-axis direction.

The flushing processing, the wiping processing, and the pumping processing are examples of predetermined recovery processing. However, in the present embodiment, the ink jet printer 100 may be capable of operating one of the flushing processing, the wiping processing, and the pumping processing, or may be capable of performing a plurality of processing operations.

As can be understood from FIGS. 1 to 6, the server 300 is connectable to the processing apparatus 200, but may be connectable to the ink jet printer 100, or may be connectable to both the processing apparatus 200 and the ink jet printer 100.

Figure 7:
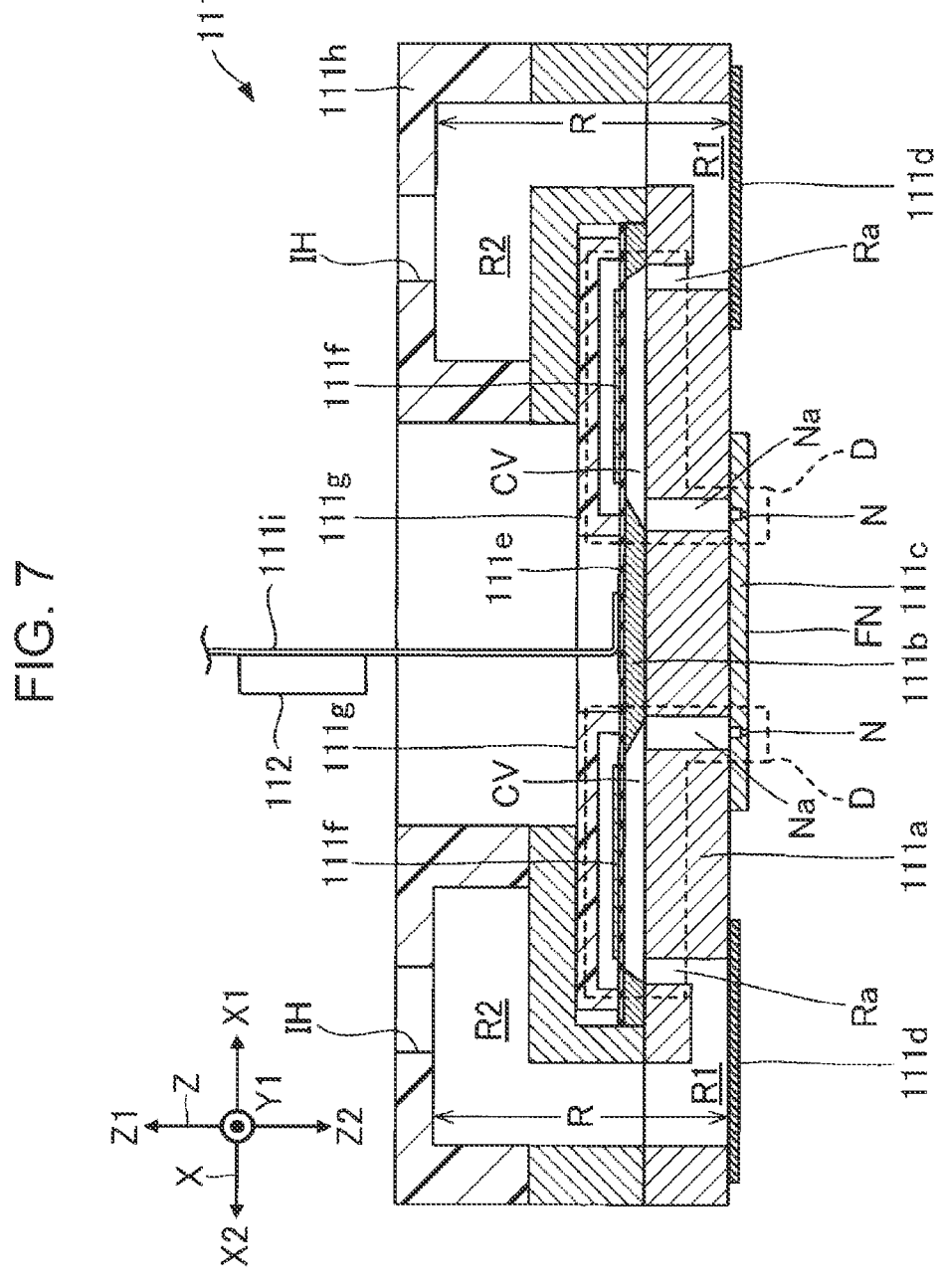
FIG. 7 is a cross-sectional view taken along line VII-VII in FIG. 6.

FIG. 7 is a cross-sectional view taken along line VII-VII in FIG. 6. Here, in FIG. 7, the drive circuit 112 is also shown in addition to the head chip 111.

The head chip 111 has a configuration substantially symmetrical with each other in the direction along the X-axis. However, as described above, the positions of M nozzles N divided into one nozzle row Ln and M nozzles N divided into the other nozzle row Ln of two nozzle rows Ln provided in one head chip 111 in the direction along the Y-axis are different from each other.

As shown in FIG. 7, the head chip 111 includes a flow path substrate 111a, a pressure chamber substrate 111b, a nozzle plate 111c, vibration absorbers 111d, a vibration plate 111e, 2M piezoelectric elements 111f, protective plates 111g, a case 111h, and a wiring substrate liii.

The flow path substrate 111a and the pressure chamber substrate 111b are stacked in this order in the Z1 direction, and form a flow path for supplying ink to 2M nozzles N. The vibration plate 111e, the 2M piezoelectric elements 111f, the protective plates 11g, the case 111h, and the wiring substrate 111i are installed in a region located in the Z1 direction with respect to a stacked body formed by the flow path substrate 111a and the pressure chamber substrate 111b. On the other hand, the nozzle plate 111c and the vibration absorbers 111d are installed in a region located in the Z2 direction with respect to the stacked body. Each element of the head chip 111 is schematically a plate-shaped member elongated in the Y direction, and is bonded to each other with, for example, an adhesive. Hereinafter, each element of the head chip 111 will be described in order.

The nozzle plate 111c is a plate-shaped member provided with M nozzles N for each of the first nozzle row Ln1 and the second nozzle row Ln2. Each of the 2M nozzles N is a through hole through which ink passes. Here, the surface of the nozzle plate 111c facing the Z2 direction is a nozzle surface FN. The nozzle plate 111c is manufactured by processing a silicon single crystal substrate by a semiconductor manufacturing technique using a processing technique such as dry etching or wet etching, for example. Here, other known methods and materials may be appropriately used for manufacturing the nozzle plate 111c. Further, the cross-sectional shape of the nozzle N is typically a circular shape, but the shape is not limited thereto, and may be, for example, a non-circular shape such as a polygonal or elliptical shape.

On the flow path substrate 111a, for each of the two nozzle rows Ln provided on the head chip 111, a space R1, 2M supply flow paths Ra, and 2M communication flow paths Na are provided. The space R1 is an elongated opening extending in the direction along the Y-axis in a plan view in the direction along the Z-axis. Each of the supply flow path Ra and the communication flow path Na is a through hole formed for each nozzle N. Each supply flow path Ra communicates with the space R1.

The pressure chamber substrate 111b is a plate-shaped member provided with 2M pressure chambers CV, which are called cavities, for each of the two nozzle rows Ln provided on the head chip 111. 2M pressure chambers CV are arranged in the direction along the Y-axis. Each pressure chamber CV is an elongated space formed for each nozzle N and extending in the direction along the X-axis in a plan view. Each of the flow path substrate 111a and the pressure chamber substrate 111b is manufactured by processing a silicon single crystal substrate by a semiconductor manufacturing technique, for example, in the same manner as the nozzle plate 111c described above. Here, other known methods and materials may be appropriately used for the manufacturing of each of the flow path substrate 111a and the pressure chamber substrate 111b.

The pressure chamber CV is a space located between the flow path substrate 111a and the vibration plate 111e. For each of the two nozzle rows Ln provided on the head chip 111, 2M pressure chambers CV are arranged in the direction along the Y-axis. Further, the pressure chamber CV communicates with each of the communication flow path Na and the supply flow path Ra. Therefore, the pressure chamber CV communicates with the nozzle N through the communication flow path Na and communicates with the space R1 through the supply flow path Ra.

The vibration plate 111e is arranged on the surface of the pressure chamber substrate 111b facing the Z1 direction. The vibration plate 111e is a plate-shaped member that can elastically vibrate. The vibration plate 111e has, for example, a first layer and a second layer, which are stacked in the Z1 direction in this order. The first layer is an elastic film made of silicon oxide, for example. The elastic film is formed, for example, by thermally oxidizing one surface of a silicon single crystal substrate. The second layer is an insulating film made of zirconium oxide, for example. The insulating film is formed by, for example, forming a zirconium layer by sputtering and thermally oxidizing the layer. The vibration plate 111e is not limited to the above-mentioned stacked configuration of the first layer and the second layer, and may be composed of, for example, a single layer or three or more layers.

On the surface of the vibration plate 111e facing the Z1 direction, 2M piezoelectric elements 111f corresponding to the nozzles N are arranged for each of the two nozzle rows Ln provided on the head chip 111. Each piezoelectric element 111f is a passive element deformed by the drive signal Com being supplied. Each piezoelectric element 111f has an elongated shape extending in the direction along the X-axis in a plan view. The 2M piezoelectric elements 111f are arranged in the direction along the Y-axis so as to correspond to the 2M pressure chambers CV. The piezoelectric element 111f overlaps the pressure chamber CV in a plan view. The piezoelectric element 111f is an example of a "drive element".

FIG. 8 is an enlarged cross-sectional diagram showing the vicinity of the piezoelectric element 111f. However, in FIG. 8, illustration of the protective plate 111g is omitted in order to prevent complication of the drawing.

As illustrated in FIG. 8, the piezoelectric element 111f is a stacked body in which a piezoelectric body Zm is interposed between an upper electrode Zu to which the offset potential VBS is supplied and a lower electrode Zd to which the drive signal Com is supplied. The piezoelectric element 111f is, for example, a portion where the lower electrode Zd, the upper electrode Zu, and the piezoelectric body Zm overlap when viewed in the Z1 direction. Further, the pressure chamber CV is provided in the Z2 direction of the piezoelectric element 111f. In the first embodiment, the offset potential VBS is supplied to the upper electrode Zu and the drive signal Com is supplied to the lower electrode Zd. However, the drive signal Com may be supplied to the upper electrode Zu, and the offset potential VBS may be supplied to the lower electrode Zd.

The description will now return to FIG. 7. The protective plate 111g is a plate-shaped member installed on the surface of the vibration plate 111e facing the Z1 direction, and protects the plurality of piezoelectric elements 111f and reinforces the mechanical strength of the vibration plate 111e. Here, the plurality of piezoelectric elements 111f are accommodated between the protective plate 11g and the vibration plate 11e. The protective plate 111g is made of, for example, a resin material.

The case 111h is a member for storing ink supplied to the plurality of pressure chambers CV. The case 111h is made of, for example, a resin material. A space R2 is provided for each of the two nozzle rows Ln provided on the head chip 111 in the case 111h. The space R2 is a space that communicates with the above-mentioned space R1 and functions as a reservoir R for storing ink supplied to the plurality of pressure chambers CV together with the space R1. An introduction port IH for supplying ink to each reservoir R is provided in the case 111h. The ink in each reservoir R is supplied to the pressure chamber CV through each supply flow path Ra.

The wiring substrate 111i is mounted on the surface of the vibration plate 111e facing the Z1 direction, and is a mounting component for electrically coupling the head chip 111, the drive circuit 112, the control module 180, and the like. The wiring substrate 111i is, for example, a flexible wiring substrate such as COF, FPC, or FFC. The above-mentioned drive circuit 112 is mounted on the wiring substrate 111i of the present embodiment. COF is an abbreviation for Chip On Film. FPC is an abbreviation for Flexible Printed Circuit. FFC is an abbreviation for Flexible Flat Cable.

As illustrated in FIG. 7, one ejection portion D includes one piezoelectric element 111f, one pressure chamber CV, and one nozzle N. That is, the 2M piezoelectric elements 111f have a one-to-one correspondence with the 2M pressure chambers CV. As can be understood from FIG. 7 and the like, the piezoelectric element 111f corresponding to the pressure chamber CV means the piezoelectric element 111f that overlaps a part or all of the pressure chamber CV in a plan view in the Z2 direction. When the drive signal Com is supplied to the piezoelectric element 111f based on the print signal SI, the ejection portion D drives the piezoelectric element 111f by means of the drive signal Com, thereby ejecting ink in the pressure chamber CV from the nozzle N.

1-5. Configuration of Head Unit HU

Hereinafter, a configuration of the head unit HU will be described with reference to FIG. 9.

Figure 9:
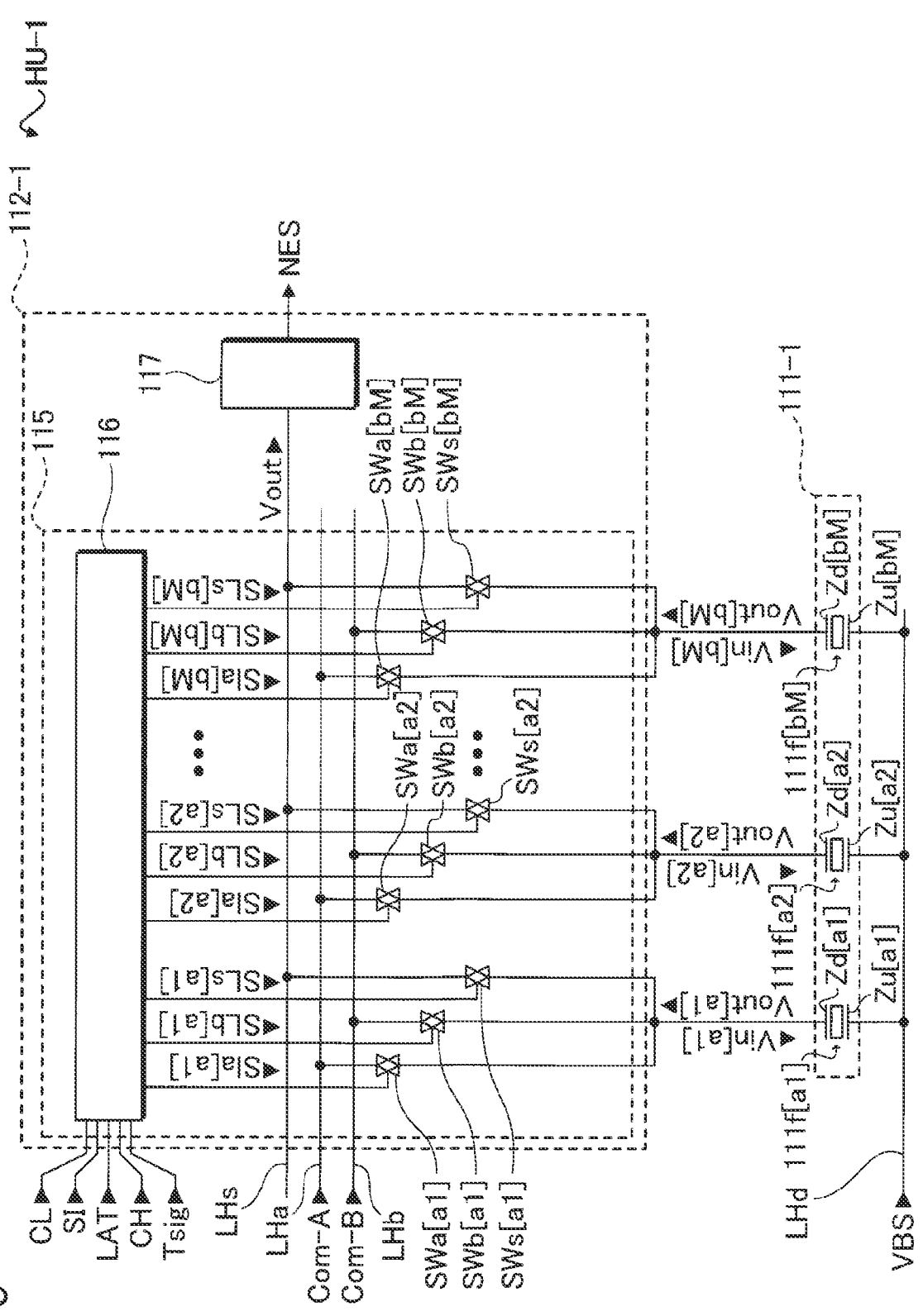
FIG. 9 is a block diagram showing an example of a configuration of a head unit.

FIG. 9 is a block diagram showing an example of a configuration of the head unit HU. FIG. 9 shows the head chip 111-1 and the drive circuit 112-1 provided in the head unit HU-1. Since the configuration of the head chip 111-2 and the drive circuit 112-2 is the same as the configuration of the head chip 111-1 and the drive circuit 112-1, illustration and description thereof will be omitted.

In addition to the head chip 111-1 and the drive circuit 112-1, the head unit HU-1 includes an internal wiring LHa to which the drive signal Com-A is supplied from the drive signal generation circuit 184, an internal wiring LHb to which the drive signal Com-B is supplied from the drive signal generation circuit 184, an internal wiring LHs for supplying the detection signal Vout detected from the piezoelectric element 111f to the detection circuit 117, and an internal wiring LHd supplied with the offset potential VBS.

As shown in FIG. 9, the switching circuit 115 includes 2M switches SWa[a1] to SWa[bM], 2M switches SWb[a1] to SWb[bM], 2M switches SWs[a1] to SWs[bM], and a coupling state designation circuit 116 that designates the coupling state of each switch. As each switch, for example, a transmission gate can be employed.

The coupling state designation circuit 116 generates coupling state designation signals SLa[a1] to SLa[bM] for designating ON/OFF of the switches SWa[a1] to SWa[bM], coupling state designation signals SLb[a1] to SLb[bM] for designating ON/OFF of the switches SWb[a1] to SWb[bM], and coupling state designation signals SLs[a1] to SLs[bM] for designating ON/OFF of the switches SWs[a1] to SWs [bM] based on at least some of the print signal SI, a latch signal LAT, a change signal CH, and a period designation signal Tsig supplied from the control circuit 170.

When n1 is a or b and m1 is any integer from 1 to M, a switch SWa[n1m1] switches conduction and non-conduction between the internal wiring LHa and a lower electrode Zd[n1m1] of a piezoelectric element 111f[n1m1] according to a coupling state designation signal SLa[n1m1]. For example, the switch SWa[n1m1] turns on when the coupling state designation signal SLa[n1m1] is at a high level, and turns off when it is at a low level.

When n1 is a or b and m1 is any integer from 1 to M, a switch SWb[n1m1] switches conduction and non-conduction between the internal wiring LHb and the lower electrode Zd[n1m1] of the piezoelectric element 111f[n1m1] provided in an ejection portion D[n1m1] according to a coupling state designation signal SLb[n1m1]. For example, the switch SWb[n1m1] turns on when the coupling state designation signal SLb[n1m1] is at a high level, and turns off when it is at a low level.

When n1 is a or b and m1 is any integer from 1 to M, a switch SWs[n1m1] switches conduction and non-conduction between the internal wiring LHs and the lower electrode Zd[n1m1] of the piezoelectric element 111f[n1m1] according to a coupling state designation signal SLs[n1m1]. For example, the switch SWs[n1m1] turns on when the coupling state designation signal SLs[n1m1] is at a high level, and turns off when it is at a low level.

When n1 is a or b and m1 is any integer from 1 to M, the detection circuit 117 is supplied with a detection signal Vout[n1m1] output from the piezoelectric element 111f [n1m1] through the internal wiring LHs. Thereafter, the detection circuit 117 generates the residual vibration signal NES based on the detection signal Vout[n1m1].

1-6. Operation of Head Unit HU

Figure 10:
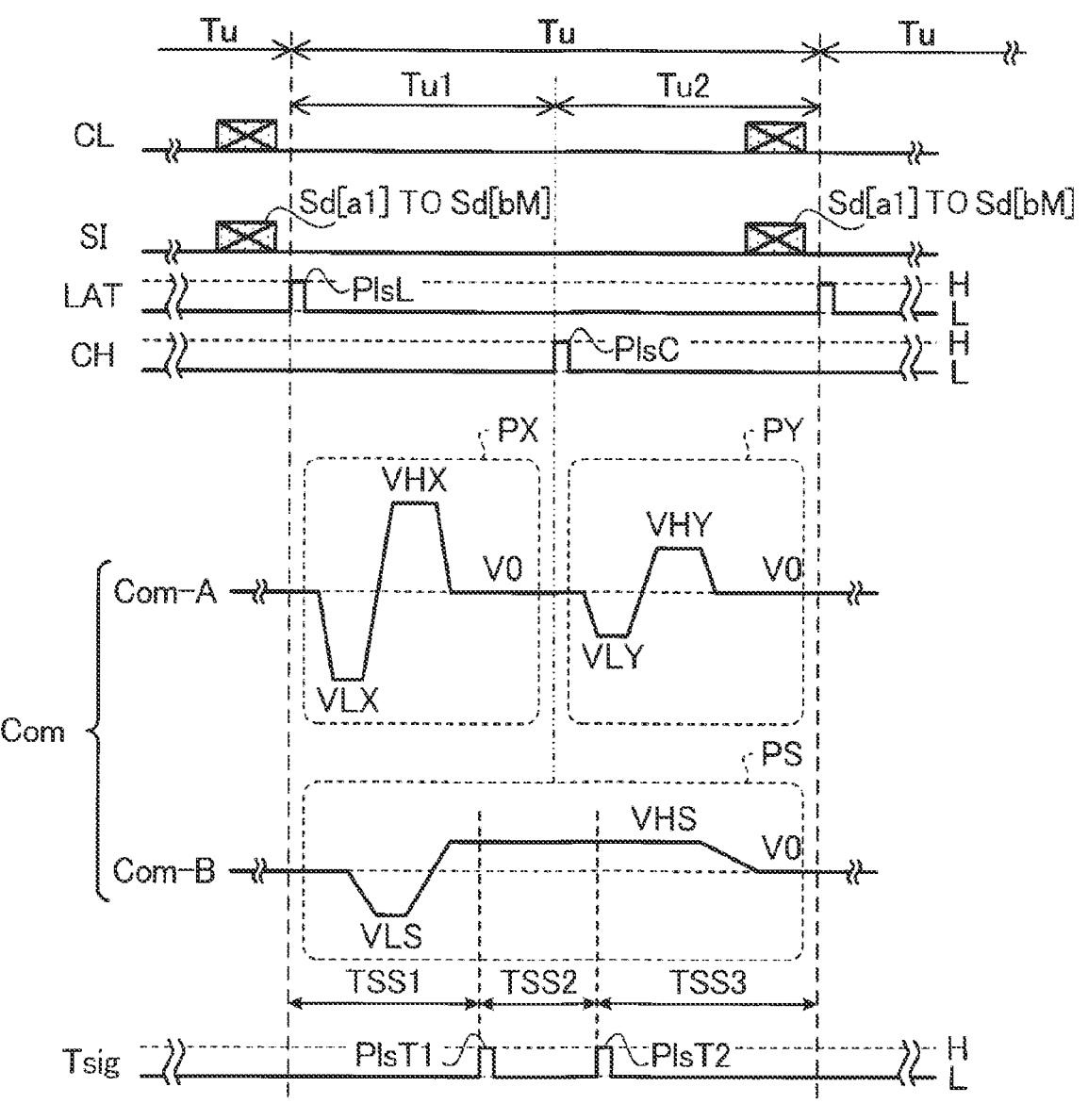
FIG. 10 is a timing chart for describing an operation of the ink jet printer in a recording period.

Hereinafter, the operation of the head unit HU will be described with reference to FIGS. 10 and 11. In FIGS. 10 and 11, the operation of the head chip 111-1 and the drive circuit 112-1 provided in the head unit HU-1 will be described in the same manner as in FIG. 9. Since the operation of the head chip 111-2 and the drive circuit 112-2 is the same as the operation of the head chip 111-1 and the drive circuit 112-1, illustration and description thereof will be omitted.

In the present embodiment, an operating period of the ink jet printer 100 includes one or more recording periods Tu. It is assumed that, in each recording period Tu, the ink jet printer 100 according to the present embodiment executes one of the driving of each ejection portion D in the recording processing and the driving of the determination target ejection portions D-H and the detection of the residual vibration in preparation processing of the ejection state determination processing. However, the present disclosure is not limited to such a mode, and in each recording period Tu, it may be possible to execute both the driving of each ejection portion D in the recording processing and the driving of the determination target ejection portions D-H and the detection of the residual vibration in the preparation processing of the ejection state determination processing.

In general, the ink jet printer 100 forms an image based on the recording data DP by ejecting the ink one or more times from each ejection portion D over a plurality of continuous or intermittent recording periods Tu. Further, in 2M recording periods Tu provided continuously or intermittently, the ink jet printer 100 according to the present embodiment executes the ejection state determination processing in which each of the 2M ejection portions D[a1] to D[bM] is defined as the determination target ejection portion D-H by executing the preparation processing of the ejection state determination processing 2M times.

FIG. 10 is a timing chart for describing an operation of the ink jet printer 100 in the recording period Tu. As shown in FIG. 10, the control circuit 170 outputs a latch signal LAT having a pulse PlsL and a change signal CH having a pulse PlsC. Thereby, the control circuit 170 defines the recording period Tu as the period from the rise of the pulse PlsL to the rise of the next pulse PlsL. Further, the control circuit 170 divides the recording period Tu into two control periods Tu1 and Tu2 by the pulse PlsC.

The print signal SI includes individual designation signals Sd[a1] to Sd[bM] that designate the driving mode of the ejection portions D[a1] to D[bM] in each recording period Tu. Then, when at least one of the recording processing and the ejection state determination processing is executed in the recording period Tu, as shown in FIG. 10, the control circuit 170 synchronizes the print signal SI including the individual designation signals Sd[a1] to Sd[bM] with a clock signal CL prior to the start of the recording period Tu and supplies the print signal SI to the coupling state designation circuit 116. In this case, when n1 is a or b and m1 is any integer from 1 to M, the coupling state designation circuit 116 generates the coupling state designation signals SLa[n1m1], SLb [n1m1], and SLs[n1m1] based on an individual designation signal Sd[n1m1] in the recording period Tu.

When n1 is a or b and m1 is any integer from 1 to M, the individual designation signal Sd[n1m1] according to the present embodiment is a signal that designates any one of five driving modes of ejection of an amount of ink corresponding to a large dot, ejection of an amount of ink corresponding to a medium dot, ejection of an amount of ink corresponding to a small dot, non-ejection of ink, and driving as a determination target in the ejection state determination processing, with respect to the ejection portion D[n1m1], in each recording period Tu. In the following description, the amount corresponding to a large dot may be referred to as a "large amount", and the ejection of an amount of ink corresponding to a large dot may be referred to as a "formation of a large dot". Similarly, the amount corresponding to a medium dot may be referred to as a "medium amount", and the ejection of an amount of ink corresponding to a medium dot may be referred to as a "formation of a medium dot". The amount corresponding to a small dot may be referred to as a "small amount", and the ejection of an amount of ink corresponding to a small dot may be referred to as a "formation of a small dot". The driving as a determination target in the ejection state determination processing may be referred to as a "driving as a determination target ejection portion D-H". In the present embodiment, as an example, it is assumed that the individual designation signal Sd[n1m1] is a 3-bit digital signal as illustrated in FIG. 11.

As shown in FIG. 10, the drive signal generation circuit 184 outputs the drive signal Com-A having a medium dot waveform PX provided in the control period Tu1 and a small dot waveform PY provided in the control period Tu2. In the present embodiment, the medium dot waveform PX and the small dot waveform PY are defined such that a potential difference between a highest potential VHX and a lowest potential VLX of the medium dot waveform PX is larger than a potential difference between a highest potential VHY and a lowest potential VLY of the small dot waveform PY Specifically, when n1 is a or b and m1 is any integer from 1 to M, in a case where the ejection portion D[n1m1] is driven by the drive signal Com-A having the medium dot waveform PX, the medium dot waveform PX is defined such that a medium amount of ink is ejected from the ejection portion D[n1m1]. Further, when the ejection portion D[n1m1] is driven by the drive signal Com-A having the small dot waveform PY, the small dot waveform PY is defined such that a small amount of ink is ejected from the ejection portion D[n1m1]. The potentials at the start and end of the medium dot waveform PX and the small dot waveform PY are set to a reference potential VO.

Then, on the assumption that n1 is a or b and m1 is any integer from 1 to M, when the individual designation signal Sd[n1m1] designates the formation of a large dot for the ejection portion D[n1m1], the coupling state designation circuit 116 sets the coupling state designation signal SLa [n1m1] to a high level in the control periods Tu1 and Tu2, and sets the coupling state designation signals SLb[n1m1] and SLs[n1m1] to a low level in the recording period Tu. In this case, the ejection portion D[n1m1] is driven by the drive signal COM-A having the medium dot waveform PX in the control period Tu1 to eject a medium amount of ink, and is driven by the drive signal COM-A having the small dot waveform PY in the control period Tu2 to eject a small amount of ink. Accordingly, the ejection portion D[n1m1] ejects a large amount of ink in total in the recording period Tu, and large dots are formed at the recording medium PP.

Further, when the individual designation signal Sd[n1m1] designates the formation of a medium dot for the ejection portion D[n1m1], the coupling state designation circuit 116 sets the coupling state designation signal SLa[n1m1] to a high level in the control period Tu1 and to a low level in the control period Tu2, respectively, and sets the coupling state designation signals SLb[n1m1] and SLs[n1m1] to a low level in the recording period Tu. In this case, the ejection portion D[n1m1] ejects a medium amount of ink in the recording period Tu, and medium dots are formed at the recording medium PP.

Further, when the individual designation signal Sd[n1m1] designates the formation of a small dot for the ejection portion D[n1m1], the coupling state designation circuit 116 sets the coupling state designation signal SLa[n1m1] to a low level in the control period Tu1 and to a high level in the control period Tu2, respectively, and sets the coupling state designation signals SLb[n1m1] and SLs[n1m1] to a low level in the recording period Tu. In this case, the ejection portion D[n1m1] ejects a small amount of ink in the recording period Tu, and small dots are formed at the recording medium PP.

Further, when the individual designation signal Sd[n1m1] designates non-ejection of ink for the ejection portion D[n1m1], the coupling state designation circuit 116 sets the coupling state designation signals SLa[n1m1], SLb[n1m1], and SLs[n1m1] to a low level in the recording period Tu. In this case, the ejection portion D[n1m1] does not eject the ink and does not form dots at the recording medium PP in the recording period Tu.

As shown in FIG. 10, the drive signal generation circuit 184 outputs the drive signal Com-B having an inspection waveform PS provided in the recording period Tu. In the present embodiment, the inspection waveform PS is defined such that a potential difference between a highest potential VHS and a lowest potential VLS of the inspection waveform PS is smaller than the potential difference between the highest potential VHY and the lowest potential VLY of the small dot waveform PY Specifically, on the assumption that n1 is a or b and m1 is any integer from 1 to M, when the drive signal Com-B having the inspection waveform PS is supplied to the ejection portion D[n1m1], the inspection waveform PS is defined such that the ejection portion D[n1m1] is driven to such an extent that ink is not ejected from the ejection portion D[n1m1]. The potential at the start and end of the inspection waveform PS is set to the reference potential VO.

In addition, the control circuit 170 outputs the period designation signal Tsig having a pulse PlsT1 and a pulse PlsT2. Thereby, the control circuit 170 divides the recording period Tu into a control period TSS1 from the start of the pulse PlsL to the start of the pulse PlsT1, a control period TSS2 from the start of the pulse PlsT1 to the start of the pulse PlsT2, and a control period TSS3 from the start of the pulse PlsT2 to the start of the next pulse PlsL.

Then, on the assumption that n1 is a or b and m1 is any integer from 1 to M, when the individual designation signal Sd[n1m1] designates the ejection portion D[n1m1] as the determination target ejection portion D-H, the coupling state designation circuit 116 sets the coupling state designation signal SLa[n1m1] to a low level in the recording period Tu, sets the coupling state designation signal SLb[n1m1] to a high level in the control periods TSS1 and TSS3 and to a low level in the control period TSS2, respectively, and sets the coupling state designation signal SLs[n1m1] to a low level in the control periods TSS1 and TSS3 and to a high level in the control period TSS2, respectively.

In this case, the determination target ejection portion D-H is driven by the drive signal COM-B having the inspection waveform PS in the control period TSS1. Specifically, the piezoelectric element 111f of the determination target ejection portion D-H is displaced by the drive signal COM-B having the inspection waveform PS in the control period TSS1. As a result, vibration is generated in the determination target ejection portion D-H, and this vibration remains even in the control period TSS2. Then, in the control period TSS2, the lower electrode Zd included in the piezoelectric element 111f of the determination target ejection portion D-H changes the potential according to the residual vibration generated in the determination target ejection portion D-H. In other words, in the control period TSS2, the lower electrode Zd included in the piezoelectric element 111f of the determination target ejection portion D-H indicates a potential corresponding to an electromotive force of the piezoelectric element 111f caused by the residual vibration generated in the determination target ejection portion D-H. Then, the potential of the lower electrode Zd can be detected as the detection signal Vout in the control period TSS2.

FIG. 11 is an explanatory diagram for describing generation of the coupling state designation signals SLa[n1m1], SLb[n1m1], and SLs[n1m1] on the assumption that n1 is a or b and m1 is any integer from 1 to M. The coupling state designation circuit 116 decodes the individual designation signal Sd[n1m1] according to FIG. 11 and generates the coupling state designation signals SLa[n1m1], SLb[n1m1], and SLs[n1m1].

As shown in FIG. 11, the individual designation signal Sd[n1m1] according to the present embodiment indicates any one of a value (1, 1, 0) that designates the formation of a large dot, a value (1, 0, 0,) that designates the formation of a medium dot, a value (0, 1, 0) that designates the formation of a small dot, a value (0, 0, 0) that designates the non-ejection of ink, and a value (1, 1, 1) that designates the driving as the determination target ejection portion D-H. Then, the coupling state designation circuit 116 sets the coupling state designation signal SLa[n1m1] to a high level in the control periods Tu1 and Tu2 when the individual designation signal Sd[n1m1] indicates the value (1, 1, 0), and sets the coupling state designation signal SLa[n1m1] to a high level in the control period Tu1 when the individual designation signal Sd[n1m1] indicates the value (1, 0, 0). The coupling state designation circuit 116 sets the coupling state designation signal SLa[n1m1] to a high level in the control period Tu2 when the individual designation signal Sd[n1m1] indicates the value (0, 1, 0), and sets the coupling state designation signal SLb[n1m1] to a high level in the control periods TSS1 and TSS3 and sets the coupling state designation signal SLs[n1m1] to a high level in the control period TSS2 when the individual designation signal Sd[n1m1] indicates the value (1, 1, 1). The coupling state designation circuit 116 sets each signal to a low level when the above conditions are not satisfied.

As described above, the detection circuit 117 generates the residual vibration signal NES based on the detection signal Vout. The residual vibration signal NES is a signal obtained by shaping the detection signal Vout into a waveform suitable for processing in the ejection state determination circuit 190 by amplifying the amplitude of the detection signal Vout and removing the noise component from the detection signal Vout. The residual vibration signal NES is an analog signal.

The detection circuit 117 may be configured to include, for example, a negative feedback type amplifier for amplifying the detection signal Vout, a low-pass filter for attenuating the high frequency component of the detection signal Vout, and a voltage follower that converts impedance and outputs low impedance residual vibration signal NES.

1-7. Ejection State Determination Circuit 190

The description will now return to FIG. 5, and the ejection state determination circuit 190 will be described. In the first embodiment, as shown in FIG. 5, a mode is assumed in which the ink jet printer 100 includes a total of four head chips 111 and four ejection state determination circuits 190 in a one-to-one correspondence.

Generally, the residual vibration generated in the ejection portion D has a natural vibration frequency determined by the shape of the nozzle N, the weight of the ink that fills the pressure chamber CV, the viscosity of the ink that fills the pressure chamber CV, and the like. When the ejection failure occurs, the frequency of the residual vibration may be higher or lower than when no ejection failure occurs. Also, when the ejection failure occurs, the amplitude of the residual vibration may be smaller than when no ejection failure occurs. The ejection state determination circuit 190 specifies one or both of the frequency of the residual vibration and the amplitude of the residual vibration based on the residual vibration signal NES, and outputs the determination information SST indicating whether or not the ejection portion D has an ejection failure based on one or both of the frequency of the residual vibration and the amplitude of the residual vibration.

1-8. Complement Processing

As described above, various ejection failures occur in the head unit HU mounted on the ink jet printer 100. It is possible to suppress deterioration in image quality by executing complement processing for compensating for the ejection failure of the head unit HU. For example, the following two modes of the complement processing can be considered. The complement processing of the first mode is drive signal correction processing for correcting the drive signal Com used in the recording processing. The complement processing of the second mode is processing for ejecting ink from a nozzle N different from the nozzle N in which the ejection failure has occurred. In the present embodiment, an example of executing the complement processing of the second mode will be described.

The complement processing of the second mode can be divided into complement destination nozzle determination processing for determining a nozzle N which is different from the nozzle N in which an ejection failure has occurred and which corrects the ejection failure, and processing for ejecting ink from the nozzle N determined by the complement destination nozzle determination processing. In the following description, the nozzle N determined by the complement destination nozzle determination processing may be referred to as a "complement destination nozzle N-H". In the data processing, the processing apparatus 200 generates the recording data DP such that the complement destination nozzle N-H ejects ink. In the recording processing, the ink jet printer 100 ejects ink from the complement destination nozzle N-H according to the recording data DP.

In the complement processing of the second mode, ink may be ejected from the complement destination nozzle N-H in the same pass as the pass to be ejected by the ejection failure nozzle N-T, or ink may be ejected from the complement destination nozzle N-H in a pass different from the pass to be ejected by the ejection failure nozzle N-T. Hereinafter, for the sake of simplification of the description, an example of ejecting ink from the complement destination nozzle N-H in the same pass as the pass to be ejected by the ejection failure nozzle N-T will be described.

When the recording system 20 always performs the complement processing, there is a problem that computational resources of the recording system 20 are allocated to the complement processing, and the computational resources of the recording system 20 cannot be sufficiently allocated to the recording processing, the data processing, and other processing. The other processing is, for example, processing for inquiring of the cloud server CS whether or not to update the ink jet program PM2. The computational resources of the recording system 20 are, for example, a period in which the control circuit 210 is used, a storage capacity in the storage circuit 220, a period in which the control circuit 170 is used, and a storage capacity in the storage circuit 160. For example, as a result of not being able to sufficiently allocate computational resources to the recording processing and the data processing, the period required for completing the recording processing and the data processing may be extended.

Here, in a mode in which the cloud server CS can be connected as in the present embodiment, it is conceivable that the cloud server CS executes a part of the complement processing of the second mode. Of the complement processing of the second mode, the complement destination nozzle determination processing can be executed by the cloud server CS. However, since the ejection failure can occur even while the recording processing and the data processing are being executed, when the cloud server CS always executes the complement destination nozzle determination processing, the recording system 20 should always be able to connect to the cloud server CS, and the time lag caused by the communication between the recording system 20 and the cloud server CS extends the period required for completing the correction processing. Therefore, it is necessary to determine which of the recording system 20 and the cloud server CS performs the complement destination nozzle determination processing for each of the various ejection failures.

Here, the inventors have focused on whether or not the ejection failure is resolved by executing predetermined recovery processing. The ejection failures can be broadly classified into an ejection failure that is resolved by executing predetermined recovery processing such as thickening of ink and an ejection failure that is not resolved even when predetermined recovery processing, such as deterioration of the piezoelectric element 111f, is performed. It is preferable that the recording system 20 executes the correction processing because the ejection failure that is resolved by executing the predetermined recovery processing can be resolved by performing the complement processing of the second mode in real time during the recording processing.

On the other hand, once an ejection failure that is not resolved even when predetermined recovery processing is executed occurs, the ejection failure continues to occur.

Therefore, for the ejection failure that is not resolved even when the predetermined recovery processing is executed, once the complement destination nozzle determination processing is performed, the result of the complement destination nozzle determination processing is continued to be used for a while. There is little need for the recording system 20 to execute such complement destination nozzle determination processing in real time, and thus the cloud server CS only needs to execute the complement destination nozzle determination processing at a predetermined timing.

In the following description, an ejection failure that is resolved by executing predetermined recovery processing may be referred to as a "recoverable ejection failure", and an ejection failure that is not resolved even when the predetermined recovery processing is executed may be referred to as an "unrecoverable ejection failure". Further, the nozzle N in which the recoverable ejection failure occurs may be referred to as a "recoverable nozzle N-R1", and the nozzle N in which the unrecoverable ejection failure occurs may be referred to as an "unrecoverable nozzle N-R2". Whether the ejection failure is a recoverable ejection failure or an unrecoverable ejection failure may be determined by actually executing predetermined recovery processing, or may be determined based on the number of ejections performed by the nozzle N without executing predetermined recovery processing. For example, when the number of times of ejection performed by the nozzle N is equal to or greater than a predetermined value, the recording system 20 may assume that the piezoelectric element 111f has deteriorated and determine that the ejection failure is an unrecoverable ejection failure. The head manufacturer sets a predetermined value by, for example, experiment or experience.

In the present embodiment, it is determined whether the ejection failure is a recoverable ejection failure or an unrecoverable ejection failure by actually executing predetermined recovery processing. Further, in the present embodiment, when it is undetermined whether the ejection failure is a recoverable ejection failure or an unrecoverable ejection failure, it is temporarily set as a recoverable ejection failure. The recoverable ejection failure is an example of a "first ejection failure", and the unrecoverable ejection failure is an example of a "second ejection failure".

As described above, in the present embodiment, the ejection failure nozzles N-T to be the target of the complement destination nozzle determination processing to be executed by each of the recording system 20 and the cloud server CS are clarified. Specifically, the recording system 20 executes the complement destination nozzle determination processing on the recoverable nozzle N-R1, and the cloud server CS executes the complement destination nozzle determination processing on the unrecoverable nozzle N-R2. Accordingly, since the recording system 20 can allocate more computational resources to recording processing and data processing as compared with the mode in which recording system 20 executes the complement destination nozzle determination processing for all the ejection failure nozzles N-T, it is possible to suppress the extension of the period required for completing the recording processing and the data processing. Further, as compared with the mode in which the cloud server CS executes the complement destination nozzle determination processing for all the ejection failure nozzles N-T, it is possible to reduce the extension of the period required for completing the complement processing of the second mode due to the time lag caused by the communication between the recording system 20 and the cloud server CS. In the first embodiment, the complement destination nozzle determination processing is an example of "first correction processing" and "second correction processing". In the following description, the complement destination nozzle determination processing executed by the recording system 20 may be referred to as the first correction processing, and the complement destination nozzle determination processing executed by the cloud server CS may be referred to as the second correction processing. In the present embodiment, the processing apparatus 200 included in the recording system 20 executes the first correction processing, but the ink jet printer 100 may execute the first correction processing, or the processing apparatus 200 and the ink jet printer 100 may cooperate to execute the first correction processing.

1-9. Functions and Operations of Ink Jet System 10

Functions and operations of the ink jet system 10 will be described with reference to FIGS. 12 to 21.

Figure 12:
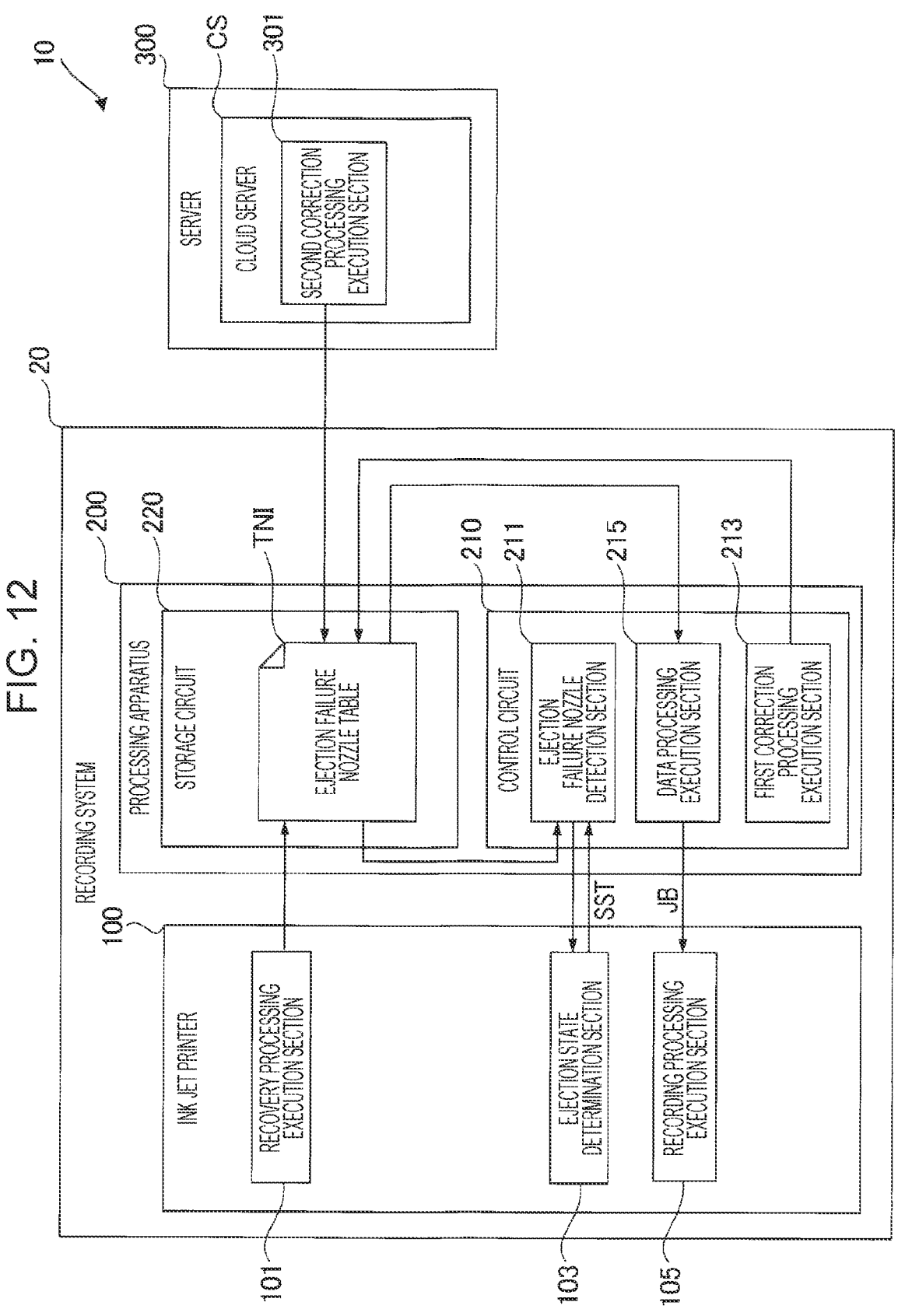
FIG. 12 is a diagram showing functions of the ink jet system.

FIG. 12 is a diagram showing the functions of the ink jet system 10. The control circuit 210 reads the ink jet program PM2 and executes the read ink jet program PM2 to function as an ejection failure nozzle detection section 211, a first correction processing execution section 213, and a data processing execution section 215. The server 300 reads the virtualization program VM and executes the read virtualization program VM to function as a cloud server CS. By reading the control program PM1 and executing the control program PM1 by the cloud server CS, the cloud server CS functions as a second correction processing execution section 301. The ink jet printer 100 functions as a recovery processing execution section 101, an ejection state determination section 103, and a recording processing execution section 105, depending on the elements of each section of the ink jet printer 100.

When the control circuit 210 executes the ink jet program PM2, an ejection failure nozzle table TNI is stored in the storage circuit 220. The contents of the ejection failure nozzle table TNI will be described with reference to FIG. 13.

FIG. 13 is a diagram showing an example of the contents of the ejection failure nozzle table TNI. The ejection failure nozzle table TNI stores, for each piece of ejection failure nozzle information indicating the ejection failure nozzle N-T, ejection failure type information indicating either a recoverable ejection failure or an unrecoverable ejection failure, and complement destination nozzle information indicating a complement destination nozzle N-H. The ejection failure nozzle table TNI has one record for one nozzle N.

The ejection failure nozzle table TNI shown in FIG. 13 has three records RC-1 to RC-3. The record RC-1 indicates that the ejection failure of a nozzle N[a1] is an unrecoverable ejection failure, and the complement destination nozzle N-H of the nozzle N[a1] is a nozzle N[c1]. The record RC-2 indicates that the ejection failure of a nozzle N[b4] is an unrecoverable ejection failure, and the complement destination nozzle N-H of the nozzle N[b4] is a nozzle N[a4]. The record RC-3 indicates that the ejection failure of a nozzle N[d4] is an unrecoverable ejection failure, and the complement destination nozzle N-H of the nozzle N[d4] is undetermined.

In the example of FIG. 13, the nozzle N not registered in the ejection failure nozzle table TNI is indicated as having the normal ejection nozzle N-S. The mode of the ejection failure nozzle table TNI is not limited to the example of FIG. 13. For example, the ejection failure type information of the ejection failure nozzle table TNI may store information indicating any one of a normal ejection, a recoverable ejection failure, and an unrecoverable ejection failure for all nozzles N provided in the ink jet printer 100.

Figure 14:
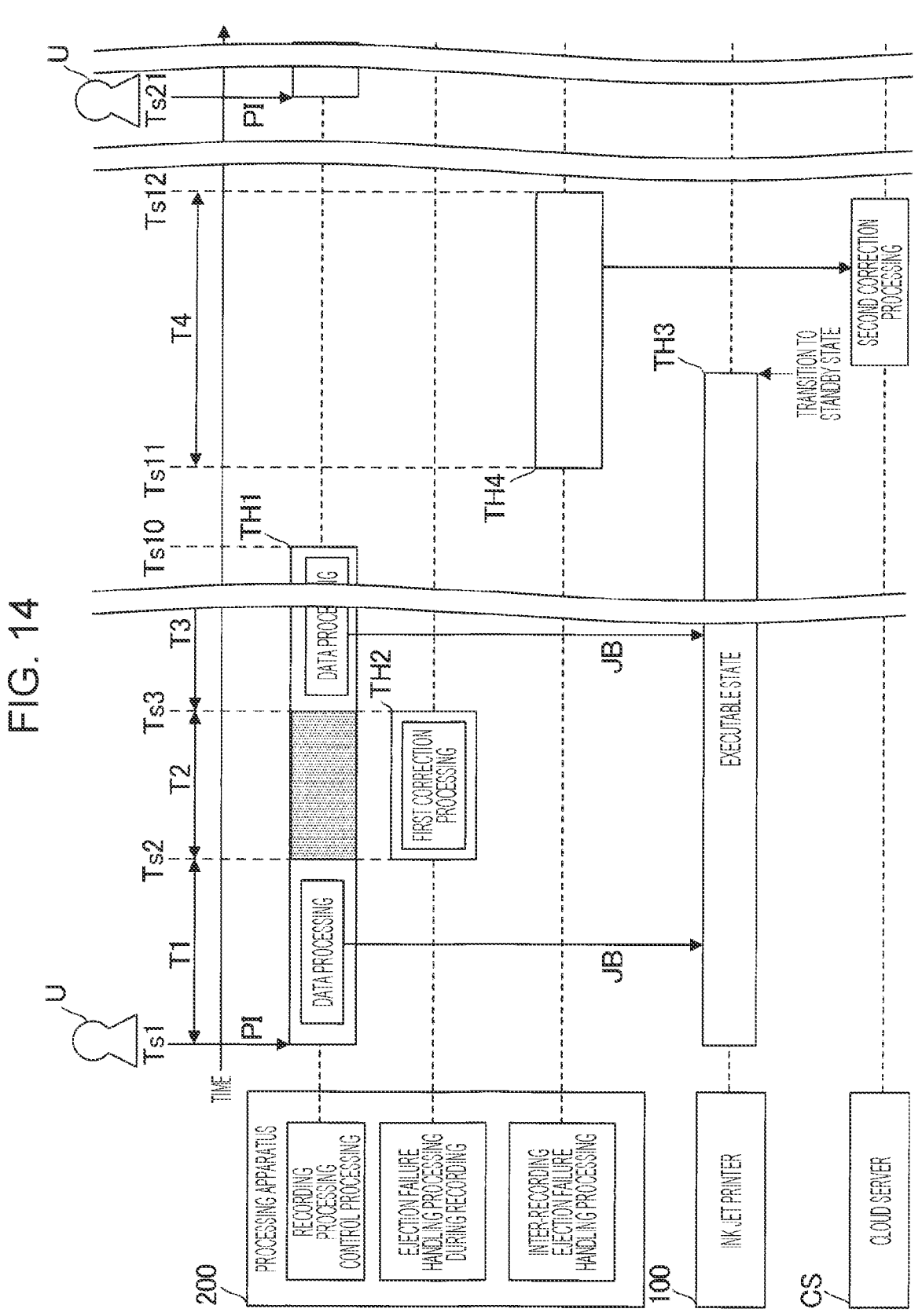
FIG. 14 is a sequence diagram showing an operation of the ink jet system.

FIG. 14 is a sequence diagram showing the operation of the ink jet system 10.

As shown in FIG. 14, when the first recording instruction PI is received from the user U at time Ts1, the control circuit 210 executes the recording processing control processing. The recording processing control processing is processing that is executed when the recording instruction PI is received and controls the recording processing, and includes data processing and ejection failure handling processing during recording. The ejection failure handling processing during recording is processing called from the recording processing control processing, is processing for handling an ejection failure of the nozzle N generated during the recording processing, and includes first correction processing.

A lateral length of a rectangle TH1 arranged to the right of the recording processing control processing in FIG. 14 indicates a period during which the control circuit 210 executes the recording processing control processing. Similarly, in FIG. 14, a lateral length of a rectangle TH2 arranged to the right of the ejection failure handling processing during recording indicates a period during which the control circuit 210 executes the ejection failure handling processing during recording. However, a shaded portion in the rectangle TH1 indicates a state in which the execution completion of the ejection failure handling processing during recording is awaited.

In addition, a lateral length of a rectangle TH3 arranged to the right of the ink jet printer 100 in FIG. 14 indicates a period during which the ink jet printer 100 can immediately execute the recording processing. In the following description, a state in which the recording processing is immediately executable may be referred to as an "executable state", and a state in which the recording processing is not immediately executable is hereinafter referred to as a "standby state". The standby state is a state in which power is supplied only to the necessary components such as making it possible to respond to a signal from the processing apparatus 200 among the components of the ink jet printer 100, and power supply to the components related to the recording processing is stopped. The components related to the recording processing are, for example, two head units HU, the moving mechanism 130, the transport mechanism 140, and the maintenance mechanism 145.

Further, as shown in FIG. 14, the control circuit 210 executes inter-recording ejection failure handling processing between a time when the recording of the image designated as the recording instruction PI ends and a time when the next recording instruction PI is issued. A lateral length of a rectangle TH4 arranged to the right of the inter-recording ejection failure handling processing in FIG. 14 indicates a period during which the control circuit 210 executes the inter-recording ejection failure handling processing. The inter-recording ejection failure handling processing is processing for handling the ejection failure of the nozzle N, and causes the cloud server CS to execute the second correction processing.

The first correction processing is executed a plurality of times in one recording instruction PI, and the second correction processing is executed once during two recording instructions PI. Therefore, the frequency at which the first correction processing is executed is higher than the frequency at which the second correction processing is executed.

The timing of executing the second correction processing may be, for example, each time a predetermined period designated by the user U elapses. The predetermined period may be any period, but is preferably longer than the period in which the first correction processing is executed. The predetermined period is, for example, several days, several hours, or the like. For example, the control circuit 210 causes the display device 270 to display "Please input a period for causing the cloud server to execute the complement destination nozzle determination processing". The user U operates the input device 260 to input a predetermined period. The predetermined period is an example of a "predetermined elapsed period".

Figure 15:
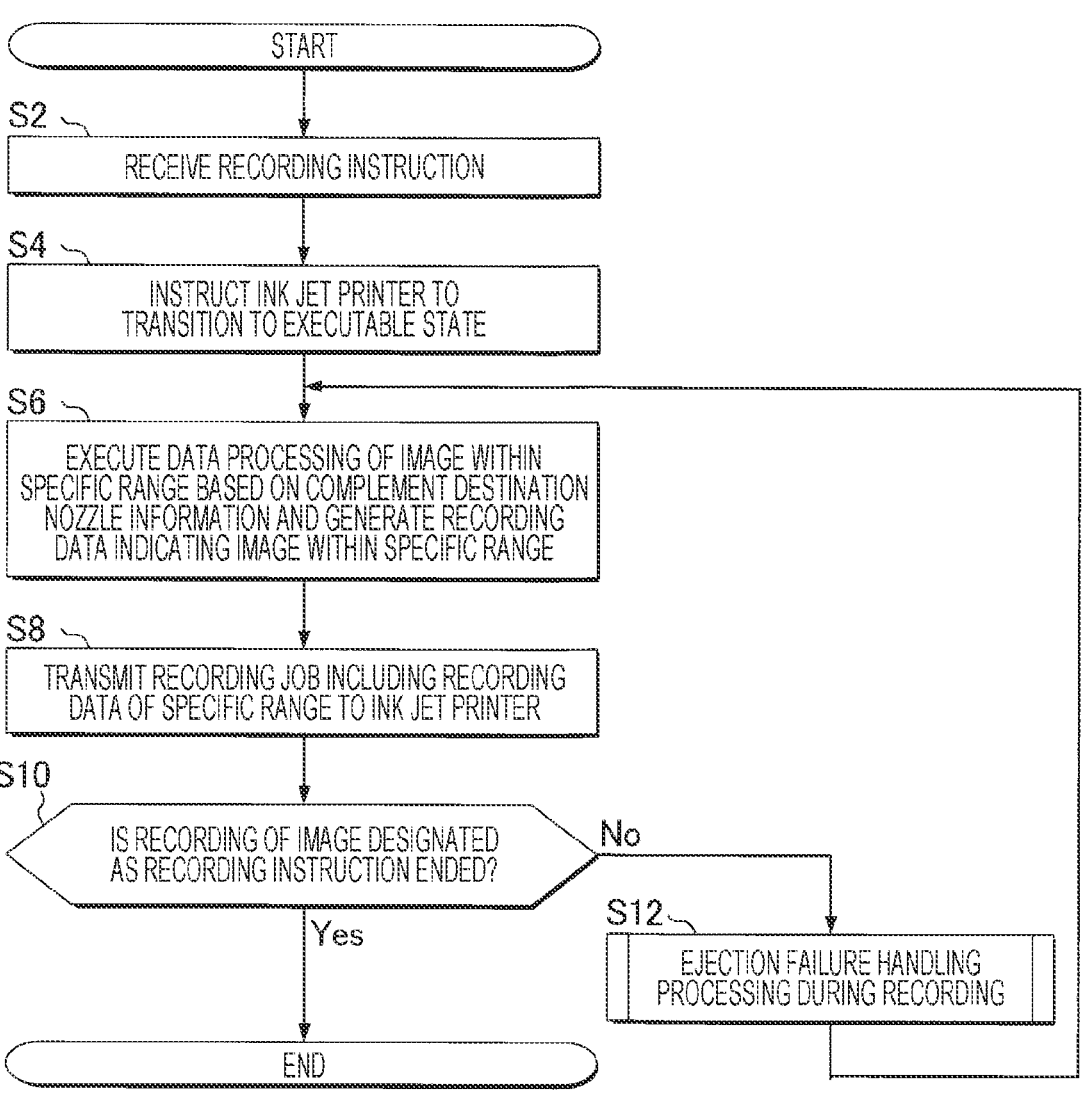
FIG. 15 is a flowchart showing an example of recording processing control processing.

FIG. 15 is a flowchart showing an example of recording processing control processing. In step S2, the control circuit 210 receives the recording instruction PI by operating the input device 260 of the user U. When the recording instruction PI is received, in step S4, the control circuit 210 instructs the ink jet printer 100 to transition to the executable state. When the instruction of the transition to the executable state is received, the ink jet printer 100 transitions from the standby state to the executable state.

When the recording instruction PI is received, in step S6, the control circuit 210 that functions as the data processing execution section 215 executes data processing of an image within a specific range based on the complement destination nozzle information in the ejection failure nozzle table TNI and generates recording data DP indicating the image within the specific range. In FIG. 14, the process of step S6 is described after the process of step S4, but the control circuit 210 may execute the process of step S4 after step S6, or may execute the process of step S4 and the process of step S6 in parallel.

The image within the specific range has, for example, the following three modes. The image within the specific range in the first mode is an image for a predetermined number of sheets of paper. The predetermined number of sheets may be any number, for example, one. The image within the specific range in the second mode is an image for a predetermined number of times of pass. The predetermined number of times may be any value. The image within the specific range in the third mode is an image that can be formed within a predetermined period. The predetermined period is, for example, a period that is an integral multiple of the recording period Tu, which is one cycle of the drive signal Com illustrated in FIG. 10. The predetermined number of sheets, the predetermined number of times, and the predetermined period described above are determined by any one of the head manufacturer, the printer manufacturer, and the user U. As the predetermined number of sheets and the predetermined number of times are reduced and the predetermined period is shortened, it is possible to shorten the period from the occurrence of ejection failure in the nozzle N to the execution of the first correction processing, and thus the quality of the image formed at the recording medium PP can be improved. On the other hand, as the predetermined number of sheets and the predetermined number of times are reduced and the predetermined period is shortened, the number of times the ejection state determination processing is executed increases, and thus the period required until the formation of the image instructed by the recording instruction PI is completed becomes longer.

For example, setting a predetermined number of times to be less than the number of passes in one recording medium PP, or setting the predetermined period to be less than the period required to form an image at one recording medium PP when the ejection state determination processing is not executed at all, during recording on one recording medium PP, it is possible to execute the ejection state determination processing to execute processing for detecting the ejection failure nozzle N-T and the first correction processing.

After the process of step S6 is ended, in step S8, the control circuit 210 transmits the recording job JB including the recording data DP indicating the image of the specific range to the ink jet printer 100 via the communication device 240. After the process of step S8 is ended, in step S10, the control circuit 210 determines whether or not recording of the image designated as the recording instruction PI is ended. When the determination result in step S10 is negative, in step S12, the control circuit 210 executes the ejection failure handling processing during recording, and after the process of step S12 is ended, returns the process to step S6.

In the sequence diagram shown in FIG. 14, the control circuit 210 executes first processing from step S2 to step S10 in a period T1 from time Ts1 to time Ts2, executes the first ejection failure handling processing during recording in a period T2 from time Ts2 to time Ts3, and executes second processing from step S2 to step S10 after time Ts3.

When the determination result in step S10 is affirmative, the control circuit 210 ends a series of processes shown in FIG. 15.

Figure 16:
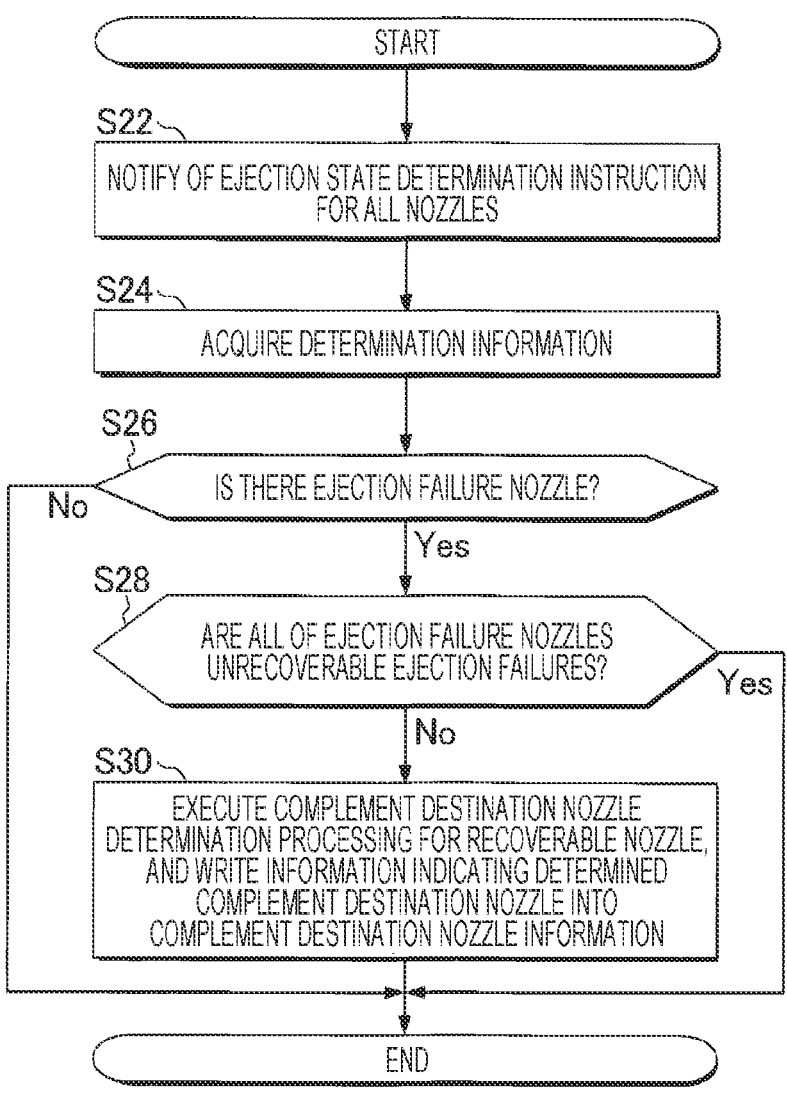
FIG. 16 is a flowchart showing an example of ejection failure handling processing during recording.

FIG. 16 is a flowchart showing an example of ejection failure handling processing during recording. In step S22, the control circuit 210 that functions as the ejection failure nozzle detection section 211 notifies the ink jet printer 100 of the ejection state determination instruction for all the nozzles N. When the ejection state determination instruction for all the nozzles N is received, the ink jet printer 100 functions as the ejection state determination section 103 and transmits the determination information SST for all the nozzles N to the processing apparatus 200.

In step S24, the control circuit 210 that functions as the ejection failure nozzle detection section 211 acquires the determination information SST for all the nozzles N. The control circuit 210 updates the ejection failure nozzle table TNI based on the determination information SST for all the nozzles N. Specifically, on the assumption that n1 is a character representing any one of a, b, c, d, e, f, g, and h and m1 is any integer 1 or more and M or less, it is assumed that determination information SST[n1m1] indicates an ejection failure and that the nozzle N[n1m1] is not registered in the ejection failure nozzle table TNI. In this case, the control circuit 210 adds a record associated with ejection failure nozzle information indicating the nozzle N[n1m1], ejection failure type information indicating recoverable ejection failure, and complement destination nozzle information indicating that the complement destination nozzle N-H is undetermined to the ejection failure nozzle table TNI.

After the process of step S24 is ended, in step S26, the control circuit 210 that functions as the ejection failure nozzle detection section 211 determines whether or not there is the ejection failure nozzle N-T by referring to the determination information SST for all the ejection portions D. A series of processes of step S22, step S24, and step S26 correspond to "processing for detecting an ejection failure".

When the determination result in step S26 is affirmative, that is, when the ejection failure nozzle N-T is detected, in step S28, the control circuit 210 determines whether or not all of the ejection failure nozzles N-T are unrecoverable ejection failures based on the ejection failure nozzle table TNI. Of the determination information SST for all the ejection portions D, when all of the nozzles N indicated as having the ejection failure nozzles N-T are indicated as having unrecoverable ejection failures in the ejection failure nozzle table TNI, the control circuit 210 determines that the determination result in step S28 is affirmative. On the other hand, among the nozzles N indicated as having the ejection failure nozzles N-T in the determination information SST for all the ejection portions D, when there is a nozzle N indicated as having a recoverable ejection failure in the ejection failure nozzle table TNI, the control circuit 210 determines that the determination result in step S28 is negative.

When the determination result in step S28 is negative, in step S30, the control circuit 210 that functions as the first correction processing execution section 213 executes the complement destination nozzle determination processing, which is the first correction processing, for the recoverable nozzle N-R1, and writes the information indicating the determined complement destination nozzle N-H into the complement destination nozzle information of the ejection failure nozzle table TNI. The complement destination nozzle N-H of the unrecoverable nozzle N-R2 has already been determined by the inter-recording ejection failure handling processing, which will be described later. An example of the complement destination nozzle determination processing will be described with reference to FIG. 17.

Figure 17:
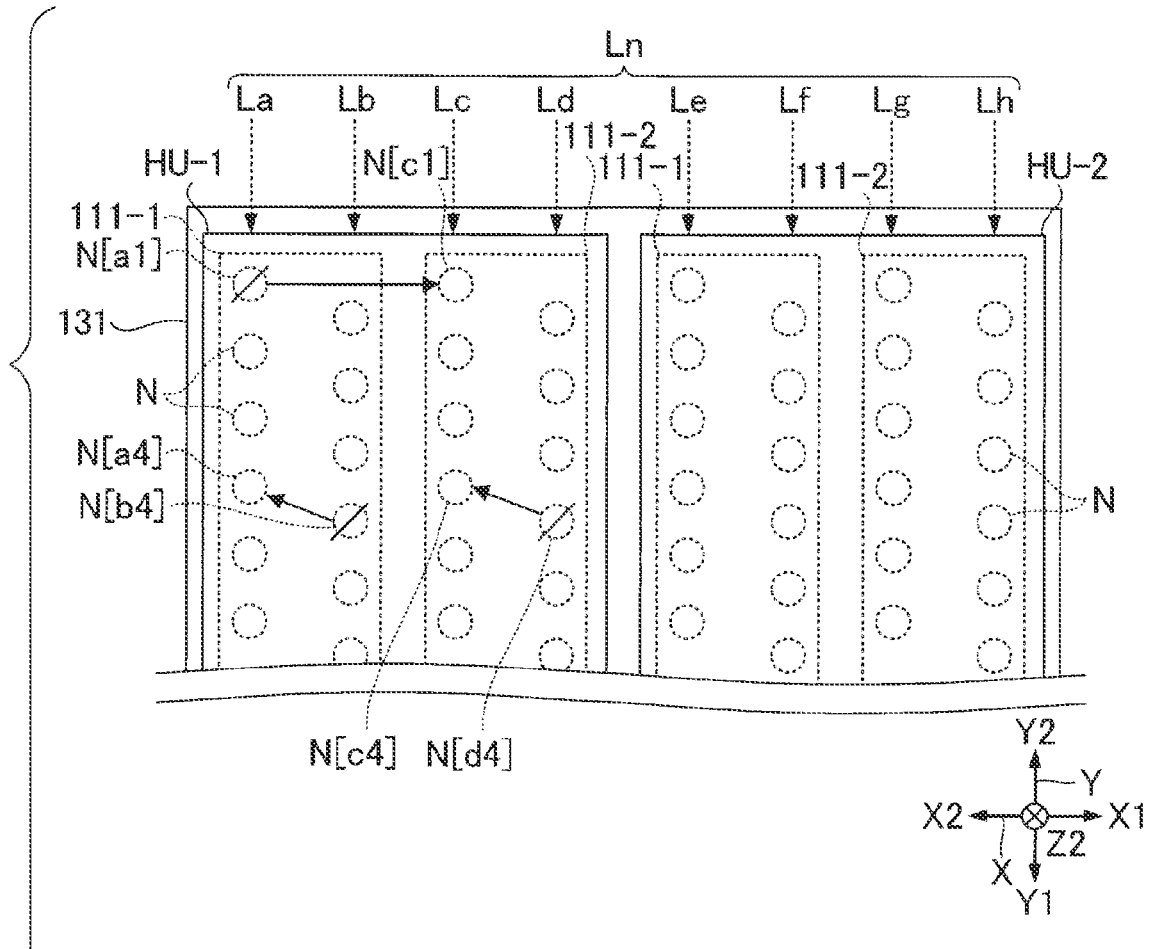
FIG. 17 is a diagram for describing an example of complement destination nozzle determination processing in the ejection failure handling processing during recording.

FIG. 17 is a diagram for describing an example of complement destination nozzle determination processing in the ejection failure handling processing during recording. In the upper portion of FIG. 17, the relationship between the ejection failure nozzle N-T and the complement destination nozzle N-H is shown by an arrow indicating from the ejection failure nozzle N-T to the complement destination nozzle N-H, and in the lower portion of FIG. 17, the ejection failure nozzle table TNI showing the state shown in the upper portion of FIG. 17 is shown. In the upper portion of FIG. 17, the recoverable nozzle N-R1 of the ejection failure nozzles N-T is represented by superimposing an oblique line on the nozzle N.

In the complement destination nozzle determination processing, in the first embodiment, the control circuit 210 searches for a nozzle N to be the complement destination nozzle N-H for the ejection failure nozzle N-T from the normal ejection nozzles N-S according to the following four priorities. When the nozzle N according to a certain priority is not the ejection failure nozzle N-T, the control circuit 210 determines the nozzle N according to a certain priority as the complement destination nozzle N-H, and when the nozzle N according to a certain priority is the ejection failure nozzle N-T, the control circuit 210 repeatedly determines whether the nozzle N according to the next priority can be determined as the complement destination nozzle N-H.

The nozzle N with a first priority ejects the same type of ink as the ink ejected by the ejection failure nozzle N-T and is the nozzle N at the same position of the ejection failure nozzle N-T. The nozzle N with a second priority ejects the same type of ink as the ink ejected by the ejection failure nozzle N-T and is the nozzle N at an adjacent position to the ejection failure nozzle N-T. The nozzle N with a third priority ejects a different type of ink from the ejection failure nozzle N-T and is the nozzle N at the same position of the ejection failure nozzle N-T. The nozzle N with a fourth priority ejects a different type of ink from the ejection failure nozzle N-T and is the nozzle N at an adjacent position to the ejection failure nozzle N-T.

The fact that the ink ejected by the complement destination nozzle N-H and the ink to be ejected by the ejection failure nozzle N-T are of the same type can improve the quality of the image formed at the recording medium PP as compared with the fact that the ink ejected by the complement destination nozzle N-H and the ink to be ejected by the ejection failure nozzle N-T are of different types. Further, as the position on the recording medium PP on which the ink ejected by the complement destination nozzle N-H lands approaches the position on the recording medium PP on which the ink to be ejected by the ejection failure nozzle N-T should land, the quality of the image formed at the recording medium PP can be improved. As described above, among the nozzle N with the first priority and the nozzle N with the fourth priority, the quality of the image formed at the recording medium PP can be maximized by ejecting the nozzle N having the first priority.

In the complement destination nozzle determination processing, the control circuit 210 refers to the ejection failure nozzle table TNI, and determines the complement destination nozzle N-H for the ejection failure nozzle N-T whose complement destination nozzle N-H is undetermined according to the above-described four priorities. In order to determine the complement destination nozzles N-H according to the above-described four priorities, the storage circuit 220 stores information indicating the positions of all nozzles N of the ink jet printer 100 and information indicating the types of ink ejected by all the nozzles N of the ink jet printer 100.

In the example of FIG. 17, an example of the complement destination nozzle determination processing in the period T2 shown in FIG. 14 is shown. FIG. 17 shows a state in which the complement destination nozzles N-H of the nozzle N[a1], the nozzle N[b4], and the nozzle N[d4] which are ejection failure nozzles N-T, are undetermined. In the complement destination nozzle determination processing, the control circuit 210 determines the complement destination nozzle N-H of the nozzle N[a1] to be the nozzle N[c1] having the first priority. Further, the control circuit 210 tries to determine the complement destination nozzle N-H of the nozzle N[b4] to be the nozzle N[d4] having the first priority, but since the nozzle N[d4] is also the ejection failure nozzle N-T, the control circuit 210 determines the complement destination nozzle N-H of the nozzle N[b4] to be the nozzle N[a4] having the second priority. Similarly, the control circuit 210 determines the complement destination nozzle N-H of the nozzle N[d4] to be the nozzle N[c4] having the second priority.

The description will now return to FIG. 16. After the process of step S30 is ended, the control circuit 210 ends a series of processes shown in FIG. 16 and executes the process of step S6. Even when the determination result in step S28 is negative or when the determination result in step S30 is affirmative, the control circuit 210 ends a series of processes shown in FIG. 16 and executes the process of step S6.

The description will now return to FIG. 14. At time Ts10 after time Ts3, the control circuit 210 ends the recording processing control processing. In a period T4 from time Ts11 to time Ts12 after time Ts10, the control circuit 210 executes the inter-recording ejection failure handling processing. Time Ts11 may be immediately after time Ts10 or after a predetermined period has elapsed from time Ts10. This predetermined period is determined by any one of the head manufacturer, the printer manufacturer, and the user U. Further, in FIG. 14, in the ink jet printer 100, the control circuit 210 maintains the executable state from the end point of the recording processing control processing to the start point of the inter-recording ejection failure handling processing, but it may temporarily transition to the standby state. The inter-recording ejection failure handling processing will be described with reference to FIGS. 18 and 19.

Figure 18:
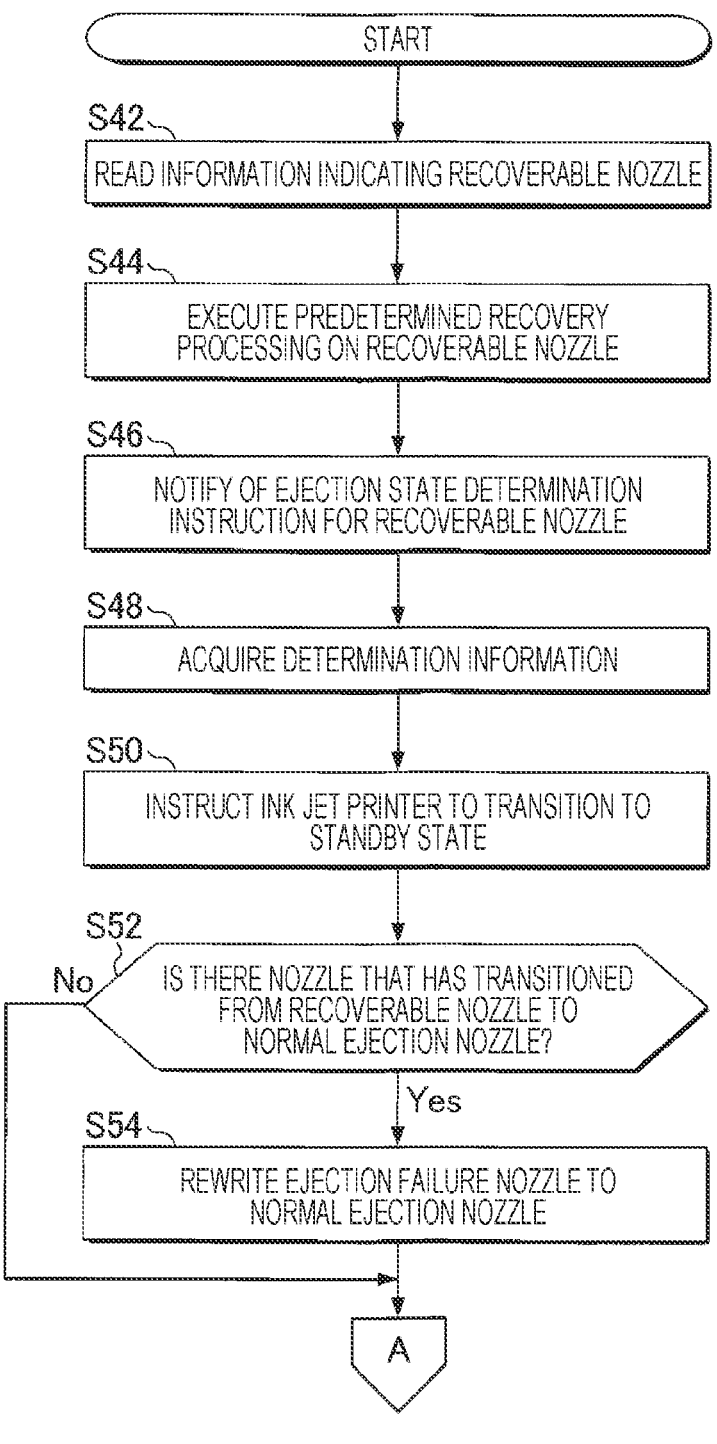
FIG. 18 is a flowchart showing an example of inter-recording ejection failure handling processing.
Figure 19:
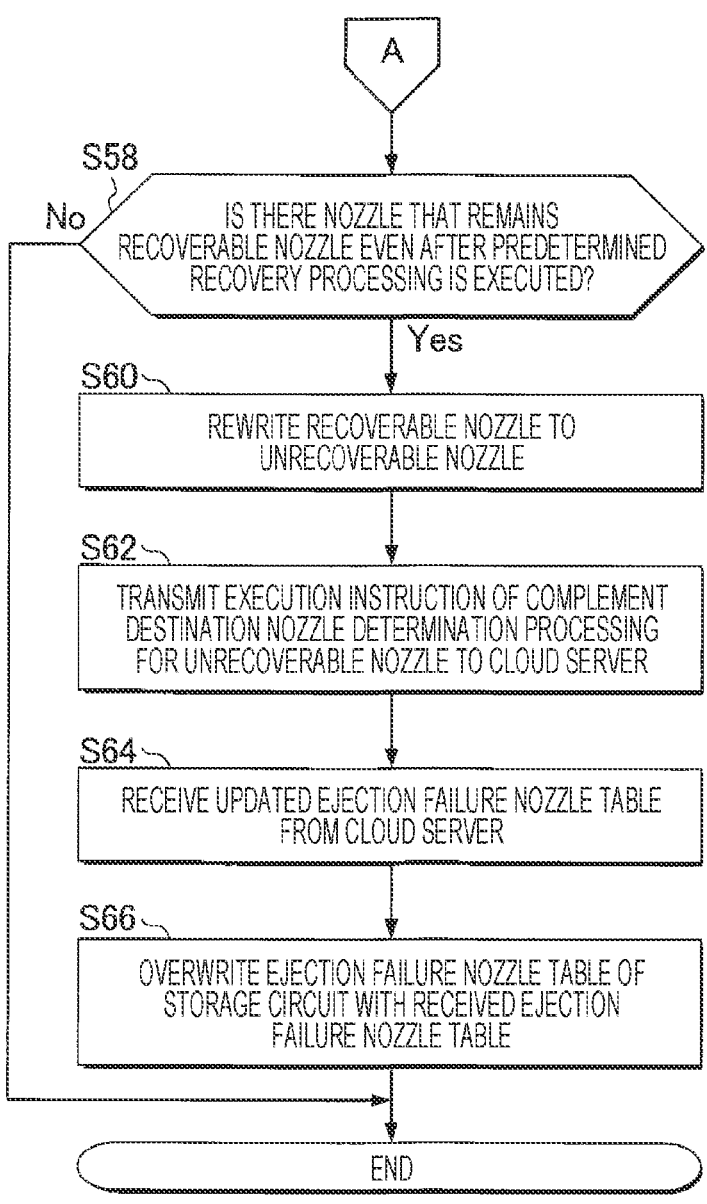
FIG. 19 is a flowchart showing an example of the inter-recording ejection failure handling processing.

FIGS. 18 and 19 are flowcharts showing an example of inter-recording ejection failure handling processing. In step S42, the control circuit 210 reads the information indicating the recoverable nozzle N-R1 from the ejection failure nozzle table TNI. Next, in step S44, the control circuit 210 causes the ink jet printer 100 to execute predetermined recovery processing on the recoverable nozzle N-R1. The ink jet printer 100 functions as a recovery processing execution section 101 to execute predetermined recovery processing on the recoverable nozzle N-R1.

After the ink jet printer 100 ends executing the predetermined recovery processing, in step S46, the control circuit 210 that functions as the ejection failure nozzle detection section 211 notifies the ink jet printer 100 of the ejection state determination instruction for the recoverable nozzle N-R1. When the ejection state determination instruction for the recoverable nozzle N-R1 is received, the ink jet printer 100 functions as the ejection state determination section 103, executes ejection state determination processing for the recoverable nozzle N-R1, and transmits determination information SST for the recoverable nozzle N-R1 to the processing apparatus 200.

In step S48, the control circuit 210 that functions as the ejection failure nozzle detection section 211 acquires the determination information SST for the recoverable nozzle N-R1. After the process of step S48 is ended, in step S50, the control circuit 210 instructs the ink jet printer 100 to transition to the standby state. The control circuit 210 may not execute the process of step S50.

After the process of step S50 is ended, in step S52, the control circuit 210 determines whether or not there is a nozzle N that has transitioned from the recoverable nozzle N-R1 to the normal ejection nozzle N-S as a result of executing predetermined recovery processing based on the ejection failure nozzle table TNI and the determination information SST for the recoverable nozzle N-R1. Specifically, the control circuit 210 determines whether or not there is a nozzle N indicating normal ejection in the determination information SST among the recoverable nozzles N-R1 in the ejection failure nozzle table TNI.

When the determination result in step S52 is affirmative, in step S54, the control circuit 210 rewrites the ejection failure nozzle N-T to the normal ejection nozzle N-S with respect to the ejection failure nozzle table TNI. Specifically, the control circuit 210 deletes the record for the nozzle N that has transitioned from the recoverable nozzle N-R1 to the normal ejection nozzle N-S from the ejection failure nozzle table TNI.

When the determination result in step S52 is negative, or after the process of step S54 is ended, in step S58, the control circuit 210 determines whether or not there is a nozzle N that remains as the recoverable nozzle N-R1 even after the predetermined recovery processing is executed. Specifically, the control circuit 210 determines that the determination result in step S58 is affirmative when there is a record of the recoverable nozzle N-R1 in the ejection failure nozzle table TNI.

When the determination result in step S58 is affirmative, in step S60, the control circuit 210 rewrites the recoverable nozzle N-R1 to the unrecoverable nozzle N-R2. Specifically, the control circuit 210 rewrites the ejection failure type information of the recoverable nozzle N-R1 in the ejection failure nozzle table TNI to an "unrecoverable ejection failure". The recoverable nozzle N-R1 is not included in the ejection failure nozzle table TNI at the stage when the execution of step S60 is ended.

After the process of step S60 is ended, in step S62, the control circuit 210 transmits an execution instruction of the complement destination nozzle determination processing for the unrecoverable nozzle N-R2 to the cloud server CS via the communication device 230. This execution instruction includes the ejection failure nozzle table TNI. When the execution instruction of the complement destination nozzle determination processing is received, the cloud server CS that functions as the second correction processing execution section 301 executes the complement destination nozzle determination processing, which is the second correction processing, for the unrecoverable nozzle N-R2. Then, the cloud server CS updates the ejection failure nozzle table TNI with the determined complement destination nozzle N-H, and transmits the updated ejection failure nozzle table TNI to the processing apparatus 200.

As can be understood from FIGS. 14, 18, and 19, in the first embodiment, the cloud server CS executes the complement destination nozzle determination processing when the ink jet printer 100 is in the standby state. However, the cloud server CS may execute the complement destination nozzle determination processing when the ink jet printer 100 is in an executable state.

An example of the complement destination nozzle determination processing executed by the cloud server CS will be described with reference to FIG. 20.

FIG. 20 is a diagram for describing an example of complement destination nozzle determination processing executed by the cloud server CS. In the upper portion of FIG. 20, similarly to FIG. 17, the relationship between the ejection failure nozzle N-T and the complement destination nozzle N-H is shown by an arrow indicating from the ejection failure nozzle N-T to the complement destination nozzle N-H, and in the lower portion of FIG. 20, the ejection failure nozzle table TNI showing the state shown in the upper portion of FIG. 20 is shown. In the upper portion of FIG. 20, the unrecoverable nozzle N-R2 of the ejection failure nozzles N-T is represented by superimposing an oblique cross on the nozzle N.

In the complement destination nozzle determination processing, the cloud server CS refers to the received ejection failure nozzle table TNI, and determines the complement destination nozzle N-H for the ejection failure nozzle N-T according to the above-described four priorities. In the present embodiment, in the complement destination nozzle determination processing executed in the ejection failure handling processing during recording by the control circuit 210, although the complement destination nozzle N-H for the ejection failure nozzle N-T have already been determined, in order to further improve the quality of the image formed at the recording medium PP, the cloud server CS again determines the complement destination nozzle N-H for the ejection failure nozzle N-T. For example, the cloud server CS generates a plurality of sets composed of candidates for the complement destination nozzles N-H determined according to the four priorities as first processing, calculates evaluation values for each of the plurality of sets as the second processing, and determines, as the complement destination nozzle N-H, a candidate for the complement destination nozzle N-H configured by the set having the highest evaluation value, as third processing.

Hereinafter, a description will be given using a specific example. For example, there are a nozzle N[a1] and a nozzle N[b2] as two ejection failure nozzles N-T, and the cloud server CS generates a first set composed of a nozzle N[n1m1] and a nozzle N[n2m2] and a second set composed of a nozzle N[n3m3] and a nozzle N[n4m4]. n1, n2, n3, and n4 are characters representing any one of a, b, c, d, e, f, g, and h. m1, m2, m3, and m4 are integers satisfying 1 or more and M or less. The nozzle N[n1m1] and the nozzle N[n3m3]

are candidates for the complement destination nozzle N-H of the nozzle N[a1], and the nozzle N[n2m2] and the nozzle N[n4m4] are candidates for the complement destination nozzle N-H of the nozzle N[ab]. As second processing, the cloud server CS calculates an evaluation value of the first set and an evaluation value of the second set. The evaluation value of the set may be higher as the quality of the image formed at the recording medium PP is higher. For example, the cloud server CS sets the evaluation values of the plurality of nozzles N included in the set of candidates in descending order of the nozzle N with the first priority, the nozzle N with the second priority, the nozzle N with the third priority, and the nozzle N with the fourth priority, and calculates the sum of the evaluation values of the plurality of nozzles N as the evaluation value of the set. For example, the cloud server CS calculates the sum of the evaluation value of the nozzle N[n1m1] and the evaluation value of the nozzle N[n2m2] as the evaluation value of the first set. As the third processing, the cloud server CS determines, as the complement destination nozzle N-H, a candidate for the complement destination nozzle N-H configured by the set having higher evaluation value from among the evaluation value of the first set and the evaluation value of the second set.

In order to determine the complement destination nozzles N-H according to the above-described four priorities, the cloud server CS, like the storage circuit 220, stores information indicating the positions of all nozzles N of the ink jet printer 100 and information indicating the types of ink ejected by all the nozzles N of the ink jet printer 100.

FIG. 20 shows an example in which ten unrecoverable nozzles N-R2 are generated. Therefore, ten records, records RC-1 to RC-10, are registered in the ejection failure nozzle table TNI. For example, in the record RC-3, the cloud server CS determines the complement destination nozzle N-H of the nozzle N[b4] from the normal ejection nozzle N-S according to the above-described four priorities. In the example of FIG. 20, the nozzle N with a first priority with respect to the nozzle N[b4] is the nozzle N[d4], which is the unrecoverable nozzle N-R2. The nozzles N with a second priority with respect to the nozzle N[b4] are the nozzle N[a4], the nozzle N[a5], the nozzle N[c4], and the nozzle N[c5], all of which are unrecoverable nozzles N-R2. Therefore, the cloud server CS determines a nozzle N[f4] which is the nozzle N with a third priority with respect to the nozzle N[b4] as the complement destination nozzle N-H.

The description will now return to FIGS. 18 and 19. In step S64, the control circuit 210 receives the updated ejection failure nozzle table TNI from the cloud server CS via the communication device 230. After the process of step S64 is ended, in step S66, the control circuit 210 overwrites the ejection failure nozzle table TNI of the storage circuit 220 with the received ejection failure nozzle table TNI. After the process of step S66 is ended, the control circuit 210 ends a series of processes shown in FIGS. 18 and 19. When the determination result in step S58 is negative, the control circuit 210 ends a series of processes shown in FIGS. 18 and 19.

The description will now return to FIG. 14. When the second recording instruction PI is received from the user U at time Ts21 after time Ts12, the control circuit 210 executes the recording processing control processing again. An example when the ejection failure handling processing during recording is executed in the second recording processing control processing and the determination result in step S28 is negative will be described with reference to FIG. 21.

FIG. 21 is a diagram for describing an example of complement destination nozzle determination processing in the second recording instruction PI. In the upper portion of FIG. 21, similarly to FIG. 17, the relationship between the ejection failure nozzle N-T and the complement destination nozzle N-H is shown by an arrow indicating from the ejection failure nozzle N-T to the complement destination nozzle N-H, and in the lower portion of FIG. 21, the ejection failure nozzle table TNI showing the state shown in the upper portion of FIG. 21 is shown. In the upper portion of FIG. 21, the recoverable nozzle N-R1 of the ejection failure nozzles N-T is represented by superimposing an oblique line on the nozzle N, and the unrecoverable nozzle N-R2 of the ejection failure nozzles N-T is represented by superimposing an oblique cross on the nozzle N.

In the complement destination nozzle determination processing, the control circuit 210 refers to the ejection failure nozzle table TNI, and determines the complement destination nozzle N-H for the ejection failure nozzle N-T whose complement destination nozzle N-H is undetermined according to the above-described four priorities.

In the example of FIG. 21, in addition to ten unrecoverable nozzles N-R2, two recoverable nozzles N-R1, a nozzle N[d2] and a nozzle N[f6], are detected. Therefore, two records, a record RC-11 and a record RC-12, are added to the ejection failure nozzle table TNI shown in FIG. 21. The control circuit 210 executes confirmation processing for confirming that the complement destination nozzle N-H of the unrecoverable nozzle N-R2 is not the recoverable nozzle N-R1 and processing for determining the complement destination nozzle N-H of the recoverable nozzle N-R1. In the confirmation processing, when the complement destination nozzle N-H of the unrecoverable nozzle N-R2 is the recoverable nozzle N-R1, the control circuit 210 again determines the complement destination nozzle N-H of the unrecoverable nozzle N-R2 from the normal ejection nozzle N-S according to the above-described four priorities.

In the example of FIG. 21, from the normal ejection nozzle N-S, the complement destination nozzle N-H of the nozzle N[d2] and the complement destination nozzle N-H of the nozzle N[f6] are determined according to the above-described four priorities.

As can be understood from FIG. 21, when the control circuit 210 confirms that the complement destination nozzle N-H of the unrecoverable nozzle N-R2 is not the recoverable nozzle N-R1, it is not necessary to execute processing for determining the complement destination nozzle N-H of the unrecoverable nozzle N-R2. Therefore, the control circuit 210 according to the first embodiment can reduce the load on the control circuit 210 during image formation by the recording instruction PI, as compared with the mode of executing the processing for determining the complement destination nozzle N-H of the unrecoverable nozzle N-R2.

1-10. Summary of First Embodiment

As described above, the ink jet system 10 is an ink jet system including the ink jet printer 100 that is equipped with the head unit HU that ejects ink and executes recording processing for recording on the recording medium PP, the processing apparatus 200 that is coupled to the ink jet printer 100 and executes data processing for causing the ink jet printer 100 to execute the recording processing, and the server 300 that operates the cloud server CS connectable to the processing apparatus 200, and when an ejection failure of the head unit HU is a recoverable ejection failure that is resolved by executing predetermined recovery processing, either the ink jet printer 100 or the processing apparatus 200 executes first correction processing, and when the ejection failure of the head unit HU is an unrecoverable ejection failure that is not resolved by executing the predetermined recovery processing, the cloud server CS executes second correction processing.

As can be understood from FIGS. 20 and 21, since the cloud server CS executes the second correction processing for the unrecoverable nozzle N-R2, the processing apparatus 200 only needs to execute the first correction processing for the recoverable nozzle N-R1. Therefore, since the ink jet system 10 according to the first embodiment can allocate more computational resources of the recording system 20 to recording processing and data processing as compared with the mode in which the processing apparatus 200 executes all the correction processing, it is possible to suppress the extension of the period required for completing the recording processing and the data processing. As described above, the cloud server CS can execute the second correction processing and reduce the load on the processing apparatus 200 and the ink jet printer 100.

Further, the frequency at which the first correction processing is executed is higher than the frequency at which the second correction processing is executed.

As compared with a mode in which the frequency at which the second correction processing is executed is lower than the frequency at which the first correction processing is executed, the ink jet system 10 according to the first embodiment can more quickly handle an ejection failure that occurs during the recording processing. Further, as described above, in general, the communication speed between the processing apparatus 200 and the server 300 is slower than the communication speed between the processing apparatus 200 and the ink jet printer 100. Therefore, by making the frequency at which the second correction processing is executed via a communication path having a slow communication speed lower than the frequency at which the first correction processing is executed, it is possible to reduce the time lag due to the slow communication speed.

In addition, the recording medium PP is a plurality of sheets of printing paper, and either the ink jet printer 100 or the processing apparatus 200 may execute processing for detecting the ejection failure of the head unit HU and the first correction processing while the ink jet printer 100 is executing the recording processing on any one of the plurality of sheets of printing paper.

The ink jet system 10 according to the first embodiment can execute the processing for detecting the ejection failure nozzle N-T and the first correction processing during recording on one recording medium PP. Since the countermeasures for the ejection failure nozzle N-T have been completed during the recording on the first sheet of the recording medium PP, the quality of the image formed at the second sheet of the recording medium PP can be improved as compared with the mode of executing the processing for detecting an ejection failure of the head unit HU and the first correction processing while the recording processing is being executed on a plurality of sheets of printing paper.

The ink jet printer 100 may execute the recording processing a plurality of times based on the recording job JB according to an instruction from the user U, and either the ink jet printer 100 or the processing apparatus 200 may execute the processing for detecting an ejection failure of the head unit HU and the first correction processing while the recording processing is being executed a plurality of times.

The ink jet system 10 according to the first embodiment can execute the processing for detecting the ejection failure nozzle N-T and the first correction processing during a plurality of times of recording processing for one recording job JB. Since the countermeasures for the ejection failure nozzle N-T are completed during the first recording job JB, the quality of the image formed by the second recording job JB can be improved as compared with the mode in which the first correction processing is not executed.

The cloud server CS may execute the second correction processing each time a predetermined period designated by the user U elapses.

When the cloud server CS frequently executes the second correction processing, the influence of the time lag due to the communication between the recording system 20 and the cloud server CS becomes large. When the user U sets an appropriate period, the influence of the time lag due to the communication between the recording system 20 and the cloud server CS can be reduced.

The cloud server CS also executes the second correction processing when the ink jet printer 100 is in the standby state.

That is, the cloud server CS can execute the second correction processing without communicating with the ink jet printer 100. Therefore, the user U does not need to transition the ink jet printer 100 from the standby state to the executable state in order to cause the cloud server CS to execute the second correction processing.

Further, the head unit HU has a plurality of nozzles N that eject ink, and the first correction processing and the second correction processing are complement destination nozzle determination processing for determining, among the plurality of nozzles N of the head unit HU, a nozzle N that is different from a nozzle N in which an ejection failure has occurred, and that is to be corrected for the ejection failure.

The ink jet system 10 according to the first embodiment can reduce the load on the recording system 20 by causing the cloud server CS to execute the complement destination nozzle determination processing which is part of the correction processing of the second mode.

2. Modification Example

Each form exemplified above can be various modified. A specific mode of modification is exemplified below. Any two or more modes selected from the following examples can be combined as appropriate as long as there is no contradiction.

2-1. First Modification Example

In the first embodiment, both the first correction processing and the second correction processing are complement destination nozzle determination processing, but the present disclosure is not limited thereto. As described above, the complement processing includes the complement processing of the first mode and the complement processing of the second mode. When the complement processing is executed by the recording system 20, the complement processing of the second mode may be executed, and when part of the complement processing is executed by the cloud server CS, the complement processing of the first mode may be executed. The drive signal correction processing, which is the complement processing of the first mode, can be divided into waveform determination processing for determining the waveform of the drive signal Com and processing for applying the drive signal Com having the determined waveform to the piezoelectric element 111f. In a first modification example, a case where the cloud server CS executes the waveform determination processing will be described.

Figure 22:
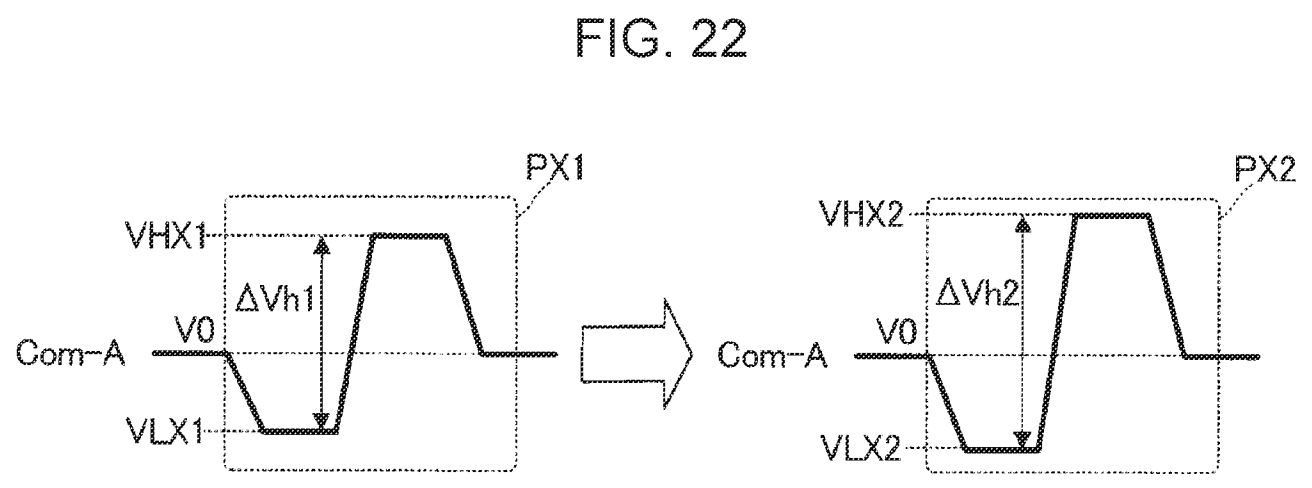

FIG. 22 is a diagram for describing an example of waveform determination processing. A medium dot waveform PX1 of the drive signal Com-A before correction is displayed on the left side of FIG. 22, and a medium dot waveform PX2 of the drive signal Com-A after correction is displayed on the right side of FIG. 22. In the following description, the medium dot waveform PX is a general term for the medium dot waveform PX1 and the medium dot waveform PX2.

The drive signal correction processing resolves the ejection failure by increasing the ejection amount of the ejection failure nozzle N-T. In the waveform determination processing, the cloud server CS determines the medium dot waveform PX2 of the drive signal Com such that the ejection amount of the corrected medium dot waveform PX2 increases. As can be understood from FIG. 22, a potential difference $\Delta Vh2$ between a lowest potential VLX2 and a highest potential VHX2 of the medium dot waveform PX2 is larger than a potential difference $\Delta Vh1$ between a lowest potential VLX1 and a highest potential VHX1 of the medium dot waveform PX1. Since the potential difference $\Delta Vh2$ is larger than the potential difference $\Delta Vh1$, the ejection amount can be increased.

After executing the waveform determination processing, the cloud server CS transmits information indicating the corrected medium dot waveform PX2 to the processing apparatus 200. The processing apparatus 200 causes the storage circuit 220 to store information indicating the medium dot waveform PX2. When the processing apparatus 200 receives the recording instruction PI from the user U, the processing apparatus 200 transmits information indicating the medium dot waveform PX2 to the ink jet printer 100. In the recording processing, the ink jet printer 100 applies the drive signal Com having the corrected medium dot waveform PX2 to the piezoelectric element 111f according to the recording data DP, and the nozzle N ejects an amount of ink corresponding to the corrected medium dot waveform PX2.

As described above, according to the first modification example, the head unit HU includes a plurality of ejection portions D each having nozzles N that eject ink and piezoelectric elements 111f that eject ink from the nozzles N by being driven based on a drive signal Com, the first correction processing is complement destination nozzle determination processing for determining, among the nozzles N of each of the plurality of ejection portions D, a nozzle N that is different from an ejection failure nozzle N-T in which an ejection failure has occurred, and that is to be corrected for the ejection failure, and the second correction processing is waveform determination processing for determining a waveform of the drive signal Com to be applied to the piezoelectric element 111f that causes ink to be ejected from the ejection failure nozzle N-T in which the ejection failure has occurred.

Comparing the first embodiment with the first modification example, by ejecting the ink with the drive signal Com having the waveform determined by the waveform determination processing, the ink can be ejected to the ejection position on the recording medium PP. Therefore, the quality of the image formed at the recording medium PP can be improved as compared with the processing for ejecting ink from a nozzle N different from the nozzle N in which ejection failure has occurred.

On the other hand, in the first modification example, since the drive signal Com having the waveform determined by the waveform determination processing is supplied to all of the 2M piezoelectric elements 111f included in one head chip 111, it is difficult to correct ejection abnormalities of the 2M nozzles N individually. Therefore, the ink jet system 10 according to the first embodiment can easily correct the ejection abnormalities of the 2M nozzles N individually as compared with the ink jet system 10 according to the first modification example.

2-2. Second Modification Example

Although it was assumed that the processing apparatus 200 can always connect to the cloud server CS in the inter-recording ejection failure handling processing of the first embodiment and the first modification example, the connection with the cloud server CS may be interrupted. Hereinafter, a mode considering a case where the connection with the cloud server CS is interrupted will be described as a second modification example.

Figure 23:
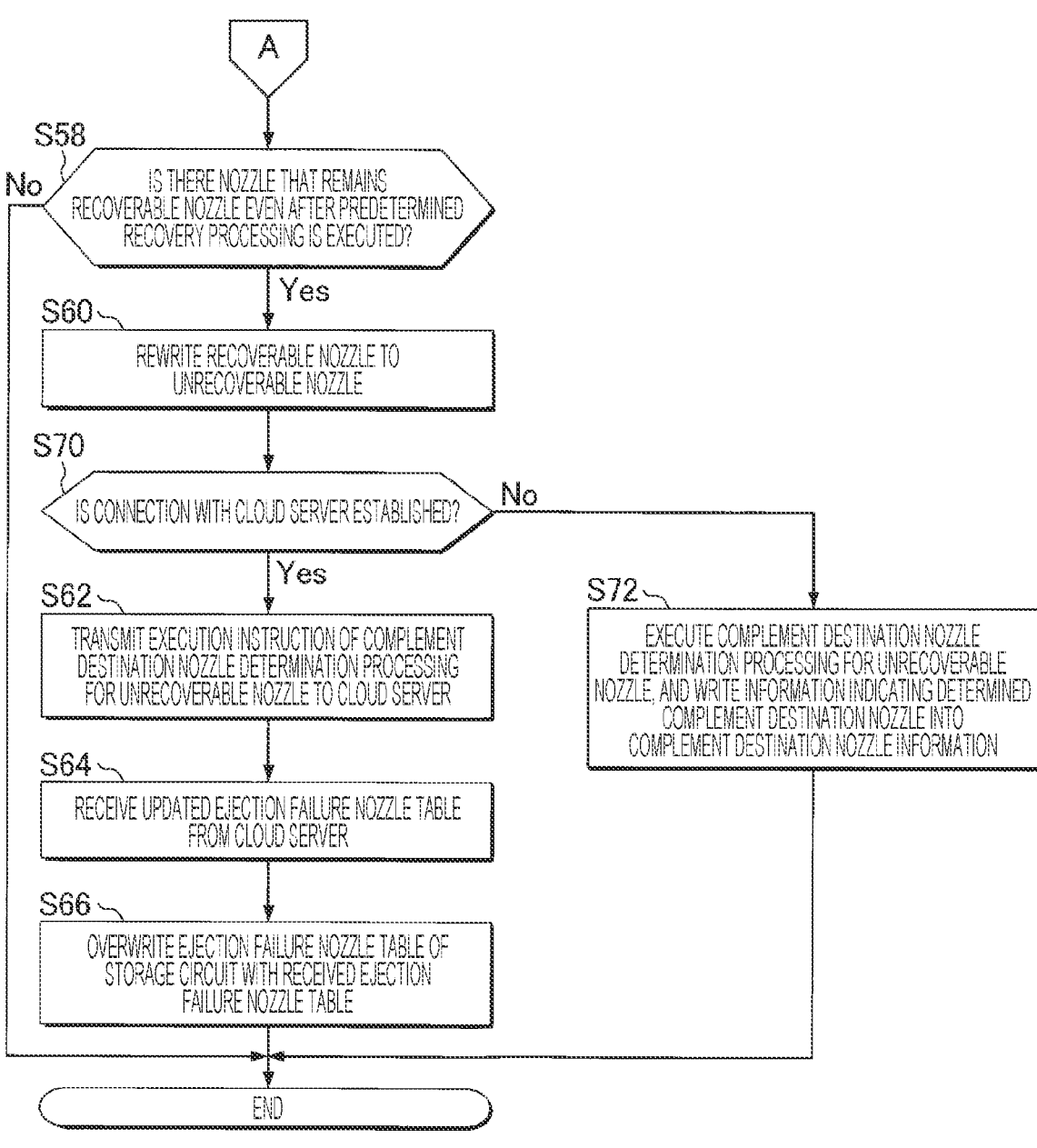
FIG. 23 is a flowchart showing inter-recording ejection failure handling processing according to a second modification example.

FIG. 23 is a flowchart showing inter-recording ejection failure handling processing according to the second modification example. However, the inter-recording ejection failure handling processing according to the second modification example differs from the inter-recording ejection failure handling processing according to the first embodiment in that there is no difference in each step shown in FIG. 18, and a new process is added between the process of step S60 and the process of step S62 shown in FIG. 19. Therefore, in FIG. 23, only the differences from each step shown in FIG. 19 are displayed in the inter-recording ejection failure handling processing according to the second modification example.

After the process of step S60 is ended, in step S70, the control circuit 210 determines whether or not the connection with the cloud server CS is established. For example, the control circuit 210 determines that the connection with the cloud server CS is established when TCP connection is established via the communication device 230, and determines that the connection with the cloud server CS is interrupted when TCP connection fails. TCP is an abbreviation for Transmission Control Protocol.

When the determination result in step S70 is negative, in step S72, the control circuit 210 executes the complement destination nozzle determination processing, which is the first correction processing, for the unrecoverable nozzle N-R2, and writes the information indicating the determined complement destination nozzle N-H into the complement destination nozzle information of the ejection failure nozzle table TNI in the storage circuit 220. After the process of step S72 is ended, the control circuit 210 ends a series of processes shown in FIG. 23. When the determination result in step S70 is affirmative, the control circuit 210 executes the process of step S62.

For example, when the connection between the processing apparatus 200 and the cloud server CS is temporarily interrupted, during the interruption of the connection, the control circuit 210 determines that step S70 is negative, and executes the complement destination nozzle determination processing, which is the first correction processing. After the connection between the processing apparatus 200 and the cloud server CS is established, the ink jet system 10 switches the first correction processing to the second correction processing, specifically, the control circuit 210 causes the cloud server CS to execute the complement destination nozzle determination processing, which is the second correction processing. Examples of the temporary interruption of the connection between the processing apparatus 200 and the cloud server CS include temporary congestion of the network NW and a state in which the virtualization program VM is not executed due to maintenance of the server 300 by the server provider.

As described above, in the ink jet system 10 according to the second modification example, when the ejection failure of the head unit HU is an unrecoverable ejection failure, and both the ink jet printer 100 and the processing apparatus 200 are disconnected from the cloud server CS, either the ink jet printer 100 or the processing apparatus 200 executes the first correction processing, and switches the first correction processing to the second correction processing after a connection is established between one of the ink jet printer 100 and the processing apparatus 200 and the cloud server CS.

Since the cloud server CS operates on the server 300 managed by the server provider, the cloud server CS may not be available at timings unintended by the head manufacturer. In the ink jet system 10 according to the second modification example, even though the connection with the cloud server CS is interrupted, when either the ink jet printer 100 or the processing apparatus 200 executes the first correction processing for the unrecoverable ejection failure, it is possible to reduce the load on the control circuit 210 during image formation according to the recording instruction PI.

In the second modification example, the case where the second correction processing is the complement destination nozzle determination processing has been described, but as in the first modification example, the second correction processing can be applied even when the waveform determination processing is performed.

2-3. Third Modification Example

In each of the above-described modes, when the ink jet printer 100 executes the first correction processing, the control circuit 170 executes the first correction processing, but the present disclosure is not limited thereto. For example, when the head unit HU has a control circuit such as a CPU, the control circuit may execute the first correction processing, or the control circuit and control circuit 170 may cooperate to execute the first correction processing.

2-4. Fourth Modification Example

In each of the above-described modes, when the ink jet printer 100 is connectable to the server 300, the communication device 150 is connected to the server 300, but the present disclosure is not limited thereto. For example, when the head unit HU has a communication device, the communication device may communicate with the server 300.

2-5. Fifth Modification Example

In each of the above-described modes, as processing for detecting the ejection failure of the head unit HU, it is determined whether or not the ejection failure occurs based on the residual vibration signal NES, but the present disclosure is not limited thereto. For example, the processing for detecting the ejection failure of the head unit HU may be processing for measuring the temperature of the ink near the nozzle N or the pressure chamber CV, estimating the degree of thickening of ink from the measurement result, and determining whether or not there is an ejection failure, processing for determining whether or not there is an ejection failure based on the flying speed of the ink, or processing for determining whether or not there is an ejection failure based on the deviation amount of the landing position of the test pattern.

2-6. Sixth Modification Example

Among the above-described modes, in the first modification example and the embodiment excluding the modification example based on the first modification example, instead of the piezoelectric element 111*f*, a heating element that converts electrical energy into thermal energy, generates air bubbles inside the pressure chamber CV by heating, and changes the pressure inside the pressure chamber CV may be employed. In a sixth modification example, the heating element is an example of a "drive element". The heating element may be, for example, an element that generates heat by supplying the drive signal Com. Also in the sixth modification example, when the cloud server CS executes the complement destination nozzle determination processing, it is possible to suppress the extension of the period required for completing the recording processing and the data processing.

2-7. Seventh Modification Example

In each of the above-described modes, the serial type ink jet printer 100 in which the head unit HU is reciprocated in the direction along the X-axis has been exemplified, but the present disclosure is not limited to such a mode. The ink jet printer 100 may be a line type liquid ejecting apparatus in which a plurality of nozzles N are distributed over the entire width of the recording medium PP.

2-8. Eighth Modification Example

Further, in each of the above-described modes, the ink jet system 10 is an ink jet system including the ink jet printer 100 that is equipped with the head unit HU that ejects ink and executes a recording operation for recording on the recording medium PP, the processing apparatus 200 that is coupled to the ink jet printer 100 and executes data processing for causing the ink jet printer 100 to execute the recording processing, and the server 300 that is connectable to either the ink jet printer 100 or the processing apparatus 200, and it can also be defined that when the ejection failure of the head unit HU is a first ejection failure, either the ink jet printer 100 or the processing apparatus 200 executes first correction processing, when the ejection failure of the head unit HU is a second ejection failure, the server 300 executes second correction processing, and the frequency at which the first correction processing is executed is higher than the frequency at which the second correction processing is executed.

The first ejection failure according to an eighth modification example is, for example, one or more of an ejection failure due to thickening, an ejection failure due to adhesion of paper dust and the like, an and ejection failure due to mixing of air bubbles. The second ejection failure according to the eighth modification example is an ejection failure different from the first ejection failure according to the eighth modification example, and is, for example, an ejection failure due to deterioration of the drive element.

2-9. Other Modification Examples

The above-described ink jet printer 100 can be employed in various devices such as a facsimile machine and a copier, in addition to a device dedicated to printing. However, the application of use of the recording apparatus of the present disclosure is not limited to printing. For example, a recording apparatus that ejects a solution of a coloring material is used as a manufacturing device forming a color filter of a liquid crystal display device. In addition, a recording apparatus that ejects a solution of a conductive material is used as a manufacturing device for forming wiring and electrodes of a wiring substrate.

What is claimed is:

1. An ink jet system comprising:
a recording apparatus that is equipped with a head unit having a plurality of nozzles that ejects ink and execute recording processing for recording on a recording medium;
a processing apparatus that is coupled to the recording apparatus and executes data processing for causing the recording apparatus to execute the recording processing; and
a server configured to be connected to any one of the recording apparatus and the processing apparatus, wherein
for each of the nozzles in the head unit, judging is executed as to whether a first ejection failure or a second ejection failure has occurred, the first ejection failure being resolved by executing predetermined recovery processing, the second ejection failure being not resolved by executing the predetermined recovery processing,
when both of a first nozzle that the first ejection failure has occurred and a second nozzle that the second ejection failure has occurred are exist in the head unit, a first correction processing is executed to the first nozzle that the first ejection failure has occurred and a second correction processing is executed to the second nozzle that the second ejection failure has occurred,
the first correction processing determines a third nozzle of the head unit that is different from the first nozzle in which the first ejection failure occurred,
the second correction processing determines a fourth nozzle of the head unit that is different from the second nozzle in which the second ejection failure occurred,
either the recording apparatus or the processing apparatus executes the first correction processing and does not execute the second correction processing, and
the server executes the second correction processing and does not execute the first correction processing.

2. The ink jet system according to claim 1, wherein
a frequency at which the first correction processing is executed is higher than a frequency at which the second correction processing is executed.

3. The ink jet system according to claim 1, wherein
the recording medium is a plurality of sheets of printing paper, and
either the recording apparatus or the processing apparatus executes processing for detecting the ejection failure of the head unit and the first correction processing while the recording apparatus is executing recording processing on any one of the plurality of sheets of printing paper.

4. The ink jet system according to claim 1, wherein
the recording apparatus executes the recording processing a plurality of times based on a recording job according to an instruction from a user, and
either the recording apparatus or the processing apparatus executes processing for detecting the ejection failure of the head unit and the first correction processing while the recording processing is being executed a plurality of times.

5. The ink jet system according to claim 1, wherein
the server executes the second correction processing each
  time a predetermined elapsed period elapses.

6. The ink jet system according to claim 1, wherein
the server executes the second correction processing when
  the recording apparatus is in a state in which the
  recording processing is not immediately executable.

7. The ink jet system according to claim 1, wherein
when the ejection failure of the head unit is the second
  ejection failure, and both the recording apparatus and
  the processing apparatus are disconnected from the
  server, either the recording apparatus or the processing
  apparatus executes the first correction processing, and
  switches the first correction processing to the second
  correction processing after a connection is established
  between one of the recording apparatus and the pro-
  cessing apparatus and the server.

8. The ink jet system according to claim 1, wherein
when the ejection failure of the head unit is a second
  ejection failure that is not resolved by either the record-
  ing apparatus or the processing apparatus, the server
  executes second correction processing.

9. An ink jet system comprising:
a recording apparatus that is equipped with a head unit
  having a plurality of nozzles that ejects ink and
  executes recording processing for recording on a
  recording medium;
a processing apparatus that is coupled to the recording
  apparatus and executes data processing for causing the
  recording apparatus to execute the recording process-
  ing; and a server configured to be connected to any one of the
  recording apparatus and the processing apparatus,
  wherein
for each of the nozzles in the head unit, judging is
  executed as to whether a first ejection failure or a
  second ejection failure has occurred, the first ejection
  failure being resolved by executing predetermined
  recovery processing, the second ejection failure being
  not resolved by executing the predetermined recovery
  processing,
when both of a first nozzle that the first ejection failure has
  occurred and a second nozzle that the second ejection
  failure has occurred are exist in the head unit, a first
  correction processing is executed to the first nozzle that
  the first ejection failure has occurred and a second
  correction processing is executed to the second nozzle
  that the second ejection failure has occurred,
the first correction processing determined a third nozzle of
  the head unit that is different from the first nozzle in
  which the first ejection failure occurred,
the second correction processing determines a fourth
  nozzle of the head unit that is different from the second
  nozzle in which the second ejection failure occurred,
either the recording apparatus or the processing apparatus
  executes the first correction processing and does not
  execute the second correction processing,
the server executes the second correction processing and
  does not execute the first correction processing, and
a frequency at which the first correction processing is
  executed is higher than a frequency at which the second
  correction processing is executed.

* * * * *